(12) United States Patent
Zhang et al.

(10) Patent No.: US 12,340,959 B2
(45) Date of Patent: Jun. 24, 2025

(54) SWITCH, POWER CONVERSION APPARATUS, AND POWER SUPPLY SYSTEM

(71) Applicant: Huawei Digital Power Technologies Co., Ltd., Shenzhen (CN)

(72) Inventors: Xiufeng Zhang, Dongguan (CN); Xiaogang Guo, Shanghai (CN); Yazhu Zhao, Shanghai (CN); Jichang Huang, Shenzhen (CN); Xiaokang Tian, Shenzhen (CN); Jianfei Ma, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 295 days.

(21) Appl. No.: 17/967,988

(22) Filed: Oct. 18, 2022

(65) Prior Publication Data
US 2023/0121284 A1   Apr. 20, 2023

(30) Foreign Application Priority Data

Oct. 18, 2021   (CN) .......................... 202111212394.3

(51) Int. Cl.
*H01H 19/14*   (2006.01)
*H01H 3/10*   (2006.01)
(Continued)

(52) U.S. Cl.
CPC .............. *H01H 19/14* (2013.01); *H01H 3/10* (2013.01); *H01H 19/20* (2013.01); *H01H 83/20* (2013.01)

(58) Field of Classification Search
CPC .. H02H 3/00; H02H 3/02; H02H 3/06; H02H 3/08; H01H 71/00; H01H 71/0271;
(Continued)

(56) References Cited

U.S. PATENT DOCUMENTS

| 6,087,913 A | 7/2000 | Castonguay et al. |
| 8,093,965 B2 * | 1/2012 | Mittelstadt ......... H01H 71/0207 335/8 |

(Continued)

FOREIGN PATENT DOCUMENTS

| CN | 103594292 A | 2/2014 |
| CN | 111863496 A | 10/2020 |

(Continued)

*Primary Examiner* — Anthony R Jimenez
(74) *Attorney, Agent, or Firm* — Maier & Maier, PLLC

(57) ABSTRACT

A switch, a power conversion apparatus, and a power supply system. The power supply system includes a control unit, a switch, a direct current source, and a power conversion unit. The switch is electrically connected between the direct current source and the power conversion unit, and the control unit is configured to send a switch-off signal to the switch when a fault occurs on the direct current source or the power conversion unit. The switch includes a contact component, a trip-free structure, and a knob that are sequentially disposed in a stacked manner in a first direction. A trip unit of the trip-free structure is configured to receive the switch-off signal, to unlock the trip unit from the cradle. The cradle drives the connecting rod structure to move, to separate the moving contact from the fixed contact.

20 Claims, 24 Drawing Sheets

(51) Int. Cl.
*H01H 19/20* (2006.01)
*H01H 83/20* (2006.01)

(58) Field of Classification Search
CPC .............. H01H 71/1009; H01H 71/10; H01H 71/1018; H01H 71/1027; H01H 71/1045; H01H 71/1054; H01H 71/12; H01H 71/56; H01H 2003/1032; H01H 2003/46; H01H 2221/00; H01H 2221/024; H01H 2221/03; H01H 3/00; H01H 3/02; H01H 3/04; H01H 3/10; H01H 3/32; H01H 19/00; H01H 19/02; H01H 19/04; H01H 19/10; H01H 19/14; H01H 19/20; H01H 19/25; H01H 83/00; H01H 83/10; H01H 83/20; H01H 13/50; H01H 13/503; H01H 13/506
USPC ........................................................ 200/336
See application file for complete search history.

(56) References Cited

U.S. PATENT DOCUMENTS

| | | |
|---|---|---|
| 2002/0158732 A1* | 10/2002 | Castonguay ......... H01H 71/126 335/172 |
| 2017/0271106 A1 | 9/2017 | Dumont et al. |
| 2019/0206636 A1 | 7/2019 | Kuhn |

FOREIGN PATENT DOCUMENTS

| | | |
|---|---|---|
| CN | 112750643 A | 5/2021 |
| CN | 113053689 A | 6/2021 |
| FR | 712405 A | 10/1931 |
| JP | 2003100194 A | 4/2003 |
| KR | 1020140051775 A | 5/2014 |

* cited by examiner

SWITCH, POWER CONVERSION APPARATUS, AND POWER SUPPLY SYSTEM

CROSS-REFERENCE TO RELATED APPLICATION

This application claims priority to Chinese Patent Application No. 202111212394.3, filed on Oct. 18, 2021, which is hereby incorporated by reference in its entirety.

TECHNICAL FIELD

The embodiments relate to the field of power supply system technologies, a switch and a power conversion apparatus in a power supply system, and the power supply system.

BACKGROUND

Switches are widely used in a power supply system. A circuit is connected or disconnected by controlling switch-on or switch-off of a switch. As a power supply system has more functions, a safety requirement becomes increasingly high. In a use process, an emergency such as a circuit fault may occur and a circuit may need to be cut off. Therefore, a switch needs to be manually operated to be switched off. If the switch cannot be operated in time to be switched off, a safety hazard is caused. Therefore, a research and development trend in the industry is to design a solution in which a switch has a trip-free function, so that when a circuit fault occurs, a system can automatically drive the switch to be switched off without a manual operation.

SUMMARY

The embodiments provide a switch, a power conversion apparatus, and a power supply system, so that when a circuit fault occurs, the system can automatically drive the switch to be switched off without a manual operation.

According to a first aspect, an embodiment may provide a power supply system, including a control unit, a switch, a direct current source, and a power conversion unit. The switch is electrically connected between the direct current source and the power conversion unit, and the control unit is configured to send a switch-off signal to the switch when a fault occurs on the direct current source or the power conversion unit. The direct current source may be a photovoltaic module, a photovoltaic string, or a series-parallel circuit formed by a photovoltaic module and a photovoltaic string, or the direct current source may be a power conversion unit. The power conversion unit may be a DC/DC converter or a DC/AC converter. The switch includes a contact component, a trip-free structure, and a knob that are sequentially disposed in a stacked manner in a first direction. The contact component includes a fixed part and a movable part. The movable part is rotatably connected to the fixed part. The fixed part is provided with a fixed contact, and the movable part is provided with a moving contact. The movable part has a central shaft. The central shaft extends in the first direction. The movable part is capable of being rotated by using the central shaft as a center, to enable the moving contact and the fixed contact to be switched on or switched off. The knob is configured to drive the moving contact and the fixed contact to be switched on or switched off. The trip-free structure includes a trip unit and a transmission structure. The transmission structure includes a connecting rod structure and a cradle. The connecting rod structure is connected between the cradle and the movable part. The cradle fits in with the trip unit. The trip unit is configured to receive the switch-off signal, to unlock the trip unit from the cradle. The cradle drives the connecting rod structure to move, to separate the moving contact from the fixed contact.

In the power supply system provided in this embodiment, when a circuit fault occurs, because the trip-free structure is disposed in the switch, trip free can be implemented. In other words, a function of automatic switch-off between the moving contact and the fixed contact can be implemented, thereby ensuring safety of the power supply system. Because the switch in the power supply system may implement a trip-free function by making the trip unit fit in with the cradle, a linkage path between the cradle and the moving contact is that the cradle drives the connecting rod structure to move and the connecting rod structure drives the moving contact to move, and the knob is completely free of this linkage path. In this way, in a tripping process of the switch, even if the knob is stuck, movement of the connecting rod structure is not affected. Therefore, in this embodiment, when the knob is stuck or blocked, the switch can still complete automatic circuit opening in a fault state.

In a possible embodiment, the knob is configured to drive the connecting rod structure to move, to drive the cradle to move to be re-buckled with the trip unit. In the solution, by rotating the knob, a re-buckling action after trip free is completed. The knob is used for manual switch-on or switch-off and can also be used for a re-buckling process, and no other driving structure needs to be disposed in the switch to drive re-buckling between the cradle and the trip unit. This is conducive to ensuring a compact structure and a miniaturized volume of the switch. In other embodiments, an automatic control apparatus may be alternatively disposed to implement re-buckling. For example, an electromagnet used for switch-on is disposed to drive the transmission structure to move, so that the cradle and the trip unit are buckled with each other.

In a possible embodiment, the trip-free structure includes a contact rotating shaft and a knob rotating shaft, the contact rotating shaft is fixedly connected to a location of the central shaft of the movable part, one end of the connecting rod structure is fixedly connected to the contact rotating shaft, the knob rotating shaft is fixedly connected to the knob, and axial extension directions of both the contact rotating shaft and the knob rotating shaft are the first direction.

In the solution, the extension directions of the contact rotating shaft and the knob rotating shaft are defined to be the same, the knob is rotated to drive the contact rotating shaft to be rotated, and a rotation direction of the knob and a rotation direction of the contact rotating shaft may be the same. Because the moving contact is inside the apparatus, the moving contact cannot be observed with naked eyes. In a process of operating the knob rotating shaft, a rotation direction of the moving contact can be intuitively learned by using the knob, thereby bringing better use experience. In addition, force is transferred between the knob and the moving contact by using the connecting rod structure, and therefore the structure is simple and ingenious and is easy to maintain.

In a possible embodiment, the trip-free structure includes a mounting bracket and a contact rotating shaft, a trip limiting structure is disposed on the mounting bracket, the contact rotating shaft is rotatably connected to the mounting bracket, the contact rotating shaft is fixedly connected to a location of the central shaft of the movable part, one end of the connecting rod structure is fixedly connected to the contact rotating shaft, limiting blocks are disposed in a protruding manner on a periphery of the contact rotating shaft, and the limiting blocks abut against the trip limiting structure in a process in which the trip unit drives the moving contact and the fixed contact to separate from each other, to limit the contact rotating shaft, so that the moving contact enters a still state in a re-buckling process.

In the solution, maximum travel of the moving contact in a trip-free process is limited by making the trip limiting structure fit in with the limiting blocks. If there is no trip limiting structure, moving travel of the moving contact in the trip-free process is larger. Consequently, in the re-buckling process, the moving contact moves and a particular rotation phenomenon of the moving contact occurs. If the maximum travel of the moving contact is not limited in the trip-free process, the particular rotation phenomenon of the moving contact easily causes an electric arc in the re-buckling process, posing a safety hazard to the power supply system. Because the maximum travel of the moving contact is limited in the solution, the electric arc caused by movement of the moving contact in the re-buckling process can be avoided, and the safety of the power supply system can be ensured. In an embodiment, there may be two fixed contacts in a contact unit, the two fixed contacts may be centrosymmetrically distributed on a periphery of the moving contact, and a location at which a rotation angle of the moving contact is 90 degrees may be an optimal location of the moving contact in a switch-off state. Therefore, at a trip location, a location of the moving contact may be rotated by 90 degrees. In this state, the moving contact is farthest from the fixed contacts.

In a possible embodiment, the moving contact is rotated on a plane perpendicular to the central shaft by using the central shaft as a center, and a rotation angle of the moving contact is greater than or equal to 50 degrees. In this embodiment, the rotation angle of the moving contact can be limited to a range greater than or equal to 50 degrees, so that the rotation angle of the moving contact may be large, and an arc blowout is easily implemented, thereby ensuring the safety of the power supply system. In an embodiment, the rotation angle of the moving contact may be 90 degrees, and, for each contact unit, two fixed contacts may exist on the periphery of the moving contact and may be distributed 180 degrees around the central shaft of the movable part on a same circumference. A most suitable location is a location at which the rotation angle of the moving contact is 90 degrees. The location is at an equal distance or an equal angle from the two fixed contacts.

In an embodiment, in a manual switch-on or switch-off process, a rotation angle of the knob may be consistent with the rotation angle of the moving contact. In this way, desirable user experience can be provided.

In a possible embodiment, the trip-free structure includes a transmission member and an elastic member, the elastic member is elastically connected between the connecting rod structure and the transmission member, and the transmission member is connected to the knob, so that manual switch-on or switch-off of the switch is capable of being implemented in a process in which the knob is rotated to drive the transmission member to swing.

In a possible embodiment, in a manual switch-on or switch-off process of the switch, a rotation angle of the knob is greater than or equal to 50 degrees. An advantage of the solution lies in that the rotation angle of the knob is large, and therefore a switch-on or switch-off location and trip location may be easily identified. In an embodiment, the rotation angle of the knob may be 90 degrees and may comply with a conventional operation habit. In this way, desirable user experience can be provided.

In a possible embodiment, the trip-free structure includes a mounting bracket and a mounting plate that are fixedly connected to each other, the mounting bracket is disposed in a stacked manner between the contact component and the mounting plate in the first direction, the transmission member and the mounting bracket are connected to a location of a transmission rotating shaft, the knob is rotatably connected to the mounting plate, the trip-free structure further includes a connection unit, the connection unit is fixedly connected to the knob, and the connection unit fits in with the transmission member, so that in a rotation process of the knob, the connection unit is capable of driving the transmission member to swing by using the transmission rotating shaft as a center. In the solution, the connection unit is disposed between the knob rotating shaft and the transmission member, so that the rotation angle of the knob can be increased. The connection unit can adjust a torque, and large switch-off force can be obtained in the solution.

In a possible embodiment, accommodation space is enclosed by the mounting bracket, the connecting rod structure, the cradle, and at least a part of the elastic member are located in the accommodation space, the transmission member includes swing arms and a connecting arm, a part of the swing arm is disposed in a stacked manner between the mounting bracket and the mounting plate in the first direction, the swing arms fit in with the connection unit so that the connection unit is capable of driving the transmission member to move, the connecting arm is bent relative to the swing arms, the connecting arm is located on one side edge of the mounting bracket, at least a part of the connecting arm faces the accommodation space, one end of the elastic member is fixedly connected to the connecting arm, and the other end of the elastic member extends into the accommodation space and is connected to the connecting rod structure. A transmission structure and a connection relationship between the connecting rod structure and the cradle and between the connecting rod structure and the transmission member may be defined in the solution. The solution features a compact structure and a small volume.

In a possible embodiment, fitting space for accommodating a part of the connection unit is disposed on the swing arms, the part of the connection unit is located in the fitting space and is capable of moving in the fitting space, and the connection unit abuts against an inner surface of the fitting space, so that the connection unit drives the transmission member to move. A fitting part of the connection unit may move in the fitting in order to reduce design difficulty and precision requirements, reduce a requirement on assembly precision, and reduce fabrication costs.

In an embodiment, a connecting rod mechanism may include a main body part and a fitting part, the fitting part may be rotatably connected to the main body part, and an outer surface of a part that is of the fitting part and that extends into the fitting space may be a cylindrical surface or an arc surface. A rotating connection structure between the fitting part and the main body part facilitates a smoother process in which the knob rotating shaft is rotated to drive the fitting part of the connection unit to move in the fitting space, and no jam situation occurs.

In a possible embodiment, the swing arm includes a plate-shaped main body and a pair of limiting blocks disposed in a protruding manner on a surface of the plate-shaped main body, and a region between the pair of limiting blocks is the fitting space. The solution is conducive to ensuring strength of the transmission member, deformation does not easily occur when the strength of the transmission member is high, and adjustment of movement precision of the moving contact is more easily ensured. This is conducive to ensuring a service life of the switch and improving precision of the switch.

In a possible embodiment, a sliding slot is disposed on the swing arms, and a region in the sliding slot is the fitting space. By disposing the sliding slot on the swing arms, the solution is conducive to an overall thin and light design of the switch.

In a possible embodiment, the connecting rod mechanism includes a main body part and a fitting part, the main body part is of an integral structure, one end of the main body part is fixedly connected to the knob, the other end of the main body part is connected to the fitting part, the fitting part is located in the fitting space, and the fitting part abuts against the inner surface of the fitting space, so that the connection unit drives the transmission member to move.

In a possible embodiment, the connecting rod mechanism includes a main body part and a fitting part, the main body part includes a driving gear and a transmission gear, the driving gear is fixedly connected to the knob, the transmission gear is rotatably connected to the mounting plate and meshes with the driving gear, a periphery of the transmission gear includes a transmission arm, the transmission arm is connected to the fitting part, the fitting part is located in the fitting space, and the fitting part abuts against the inner surface of the fitting space, so that the connection unit drives the transmission member to move.

In a possible embodiment, the fitting part is rotatably connected to the main body part.

In a possible embodiment, when the switch is in a manual switch-on state, the knob is located at a first location; when the switch is in a manual switch-off state, the knob is located at a second location; or in a state in which the trip unit drives the moving contact and the fixed contact to separate from each other, the switch is in a tripping state, and the knob is located at a third location, where the third location is between the first location and the second location. An included angle between the first location and the second location is 90 degrees, and therefore the solution provides desirable user experience. An arrow-like mark may be set on an outer surface of a handle of the knob, and a state of the switch may be indicated by using a corresponding indication relationship between the arrow and the first location, between the arrow and the second location, and between the arrow and the third location.

In a possible embodiment, the connecting rod structure includes an upper connecting rod, a lower connecting rod, and a main shaft, one end of the upper connecting rod is rotatably connected to the cradle, the other end of the upper connecting rod is rotatably connected to one end of the lower connecting rod by using a first rotating shaft, the other end of the lower connecting rod is rotatably connected to one end of the main shaft, the other end of the main shaft is fixedly connected to the moving contact, one end of the elastic member is fixedly connected to a location of the first rotating shaft, and a groove is formed at an edge location of the cradle; in a process in which the switch is switched between a manual switch-off state and a manual switch-on state, the first rotating shaft moves in the groove; and movement of the connecting rod structure is restricted by contact between the first rotating shaft and an inner wall of the groove, to limit the moving contact to be in the manual switch-off state. In the solution, the limiting structure is fabricated on the cradle by removing materials, that is, the switch is limited to be at a manual switch-off location by disposing the groove and making the first rotating shaft fit in with the inner wall of the groove. This is conducive to a thin and light design of the switch.

In a possible embodiment, the trip-free structure includes a mounting bracket, a switch-on limiting structure is disposed on the mounting bracket; when the switch is in the manual switch-on state, the upper connecting rod is in contact with the switch-on limiting structure; and the movement of the connecting rod structure is restricted by using the switch-on limiting structure, to limit the moving contact to be in the manual switch-on state. In the solution, the switch-on limiting structure is fastened to the mounting bracket, so that the manual switch-off location and a manual switch-on location of the switch may have a small size, both the size of the switch and large travel between manual switch-off and manual switch-on can be considered, a large rotation angle of the knob can be obtained, and a small size of the trip-free structure can be ensured.

In a possible embodiment, the cradle is rotatably connected to the mounting bracket by using a cradle rotating shaft, and the switch-on limiting structure is located on the cradle rotating shaft. In the solution, the switch-on limiting structure may be on the cradle rotating shaft, and no switch-on limiting structure needs to be disposed outside the cradle rotating shaft. This reduces occupied space, and also facilitates a simple and ingenious structure of the switch.

In a possible embodiment, the cradle includes a buckle structure, the buckle structure is configured to be buckled with the trip unit, the cradle is rotatably connected to the connecting rod structure by using a second rotating shaft, and a center of the second rotating shaft, a center of the cradle rotating shaft, and any point on the buckle structure form an acute triangle. In the solution, the center of the second rotating shaft, the center of the cradle rotating shaft, and the any point on the buckle structure may form an acute triangle that enables a size of the cradle to be controlled within a small area, and the trip-free structure with a small size can be easily obtained. In this way, an area occupied by the switch on a circuit board in a power conversion apparatus is reduced.

In a possible embodiment, the connecting rod structure includes an upper connecting rod, a lower connecting rod, and a main shaft, one end of the upper connecting rod is rotatably connected to the cradle, the other end of the upper connecting rod is rotatably connected to one end of the lower connecting rod by using a first rotating shaft, the other end of the lower connecting rod is rotatably connected to one end of the main shaft, the other end of the main shaft is fixedly connected to the moving contact, one end of the elastic member is fixedly connected to a location of the first rotating shaft, the switch is in a manual switch-on state, and an included angle between the lower connecting rod and the upper connecting rod is greater than or equal to 170 degrees and less than 180 degrees.

An advantage of limiting a range of the included angle between the upper connecting rod and the lower connecting rod is that fast switch-off can be implemented. In the manual switch-on state, the connecting rod structure can quickly drive the moving contact to move, and if the included angle between the upper connecting rod and the lower connecting rod is closer to 180 degrees, a speed of driving the moving contact and the fixed contact to be switched off is faster. The range of the included angle between the upper connecting rod and the lower connecting rod may be from 170 degrees to 178 degrees in consideration of factors such as a design error, a fabrication process tolerance, and an error in an assembly process. In an embodiment, the range of the included angle between the upper connecting rod and the lower connecting rod is from 175 degrees to 178 degrees. This can improve a switch-off function of the switch.

In a possible embodiment, when the moving contact is in contact with the fixed contact, clamping force exists between the moving contact and the fixed contact, a direction of the clamping force is the first direction, a moving direction of the moving contact is perpendicular to the first direction when the moving contact is separated from the fixed contact, the connecting rod structure includes an upper connecting rod, a lower connecting rod, and a main shaft, one end of the upper connecting rod is rotatably connected to the cradle, the other end of the upper connecting rod is rotatably connected to one end of the lower connecting rod by using a first rotating shaft, the other end of the lower connecting rod is rotatably connected to one end of the main shaft, the other end of the main shaft is fixedly connected to the moving contact, one end of the elastic member is fixedly connected to a location of the first rotating shaft, the switch is in a manual switch-off state, and an included angle between an elastic force direction of the elastic member and the upper connecting rod is greater than or equal to 30 degrees and less than or equal to 45 degrees.

The elastic force direction of the elastic member is a direction of a connection line between two ends of the elastic member, and an extension direction of the upper connecting rod is a direction of a connection line between a central location of a rotating shaft between the upper connecting rod and the cradle and a central location of the rotating shaft between the lower connecting rod and the upper connecting rod. In this embodiment, large switch-off force can be achieved by limiting a range of the included angle between the elastic force direction of the elastic member and the upper connecting rod in the manual switch-off state. A larger included angle between the elastic member and the upper connecting rod leads to larger switch-off force. However, to provide suitable driving force for the moving contact in switch-on and trip-free processes of the switch, the included angle between the elastic force direction of the elastic member and the upper connecting rod may be limited to be greater than or equal to 35 degrees and less than or equal to 40 degrees.

According to a second aspect, an embodiment may provide a switch. The switch includes a contact component, a knob, and a trip-free structure. The contact component includes a fixed part and a movable part. The fixed part is disposed on a periphery of the movable part. The fixed part is provided with a fixed contact, and the movable part is provided with a moving contact. The movable part has a central shaft. The central shaft extends in a first direction. The movable part is capable of being rotated by using the central shaft as a center. The knob is configured to drive the moving contact and the fixed contact to be switched on or switched off. The trip-free structure is disposed in a stacked manner between the knob and the contact component in the first direction. The trip-free structure includes a trip unit and a transmission structure. The transmission structure includes a connecting rod structure and a cradle. The connecting rod structure is connected between the cradle and the movable part. The cradle fits in with the trip unit. The trip unit is configured to receive a switch-off signal sent by a control unit in a power supply system, to unlock the trip unit from the cradle. The cradle drives the connecting rod structure to move, to separate the moving contact from the fixed contact.

The embodiments of the switch in the second aspect may be the same as the embodiments of the switch in the power supply system in the first aspect. Details are not described again.

According to a third aspect, an embodiment may provide a power conversion apparatus, including a housing and the switch according to any one of the second aspect or the possible embodiments of the second aspect. The knob of the switch is located outside the housing, and the contact component and the trip-free structure of the switch are located inside the housing.

In a possible embodiment, the power conversion apparatus is an inverter.

In a possible embodiment, a circuit board is disposed in the power conversion apparatus, the housing surrounds accommodation space, the circuit board is disposed in the accommodation space, the contact component and the trip-free structure of the switch are located in the accommodation space and are electrically connected to the circuit board, and the knob is located on one side of an outer surface of the housing. A control unit is disposed on the circuit board, the control unit is electrically connected to the trip-free structure, and the control unit is configured to send a switch-off signal to the trip-free structure, so that the trip-free structure can drive the contact component to be switched off.

BRIEF DESCRIPTION OF THE DRAWINGS

To describe the embodiments more clearly, the following describes the accompanying drawings.

DETAILED DESCRIPTION OF THE EMBODIMENTS

The following describes the embodiments with reference to the accompanying drawings.

Figure 1:
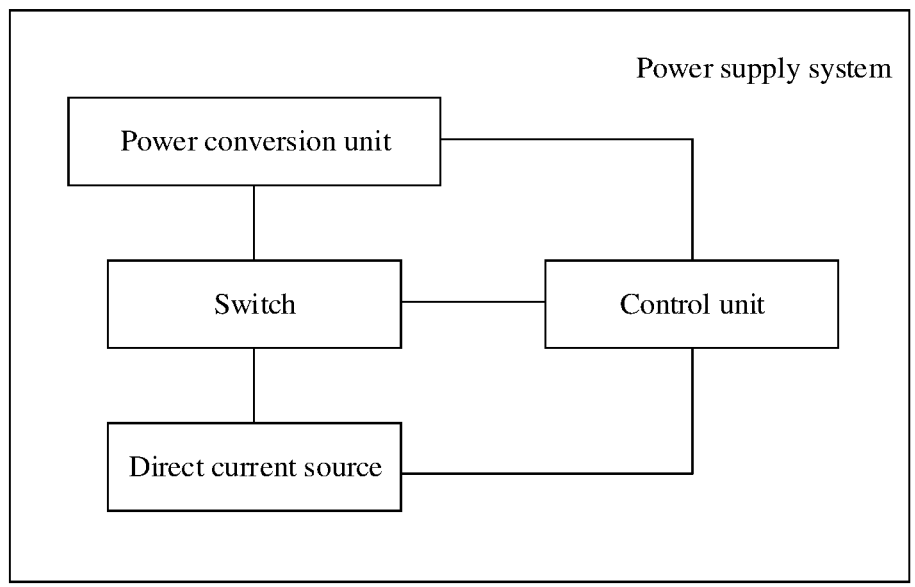
FIG. 1 is a schematic diagram of a power supply system according to an embodiment.

As shown in FIG. 1, an embodiment may provide a power supply system and a switch applied to the power supply system. The power supply system includes a control unit, a switch, a direct current source, and a power conversion unit. The switch is electrically connected between the direct current source and the power conversion unit, and the control unit is configured to send a switch-off signal to the switch when a fault occurs on the direct current source or the power conversion unit. The direct current source may be a photovoltaic module, a photovoltaic string, or a series-parallel circuit formed by a photovoltaic module and a photovoltaic string, or the direct current source may be a power conversion unit. The power conversion unit may be a DC/DC converter or a DC/AC converter. Both the direct current source and the power conversion unit may be considered as power supply circuits. When a fault occurs on a power supply circuit, for example, if a fault occurs on the direct current source or the power conversion unit, the control unit detects an occurrence of the fault, and the control unit can send a switch-off signal to the switch. This switch-off signal is used to trigger (that is, drive) the switch to be switched off and disconnect the circuit.

In an embodiment, the control unit may be an independent controller. The controller is disposed in the power supply system independently of the direct current source and the power conversion unit, and is electrically connected to the power conversion unit, the direct current source, and the switch by using a signal cable. In an embodiment, the power conversion unit may be an independent power conversion apparatus, for example, an inverter. In an embodiment, the control unit may be alternatively integrated into another functional apparatus. For example, the control unit may be integrated into an inverter, and may be a control circuit or a control chip on a main board in the inverter. In this way, as an independent apparatus, the power conversion apparatus can have a trip-free function in any scenario, that is, can perform automatic tripping in case of a circuit fault.

Figure 2:
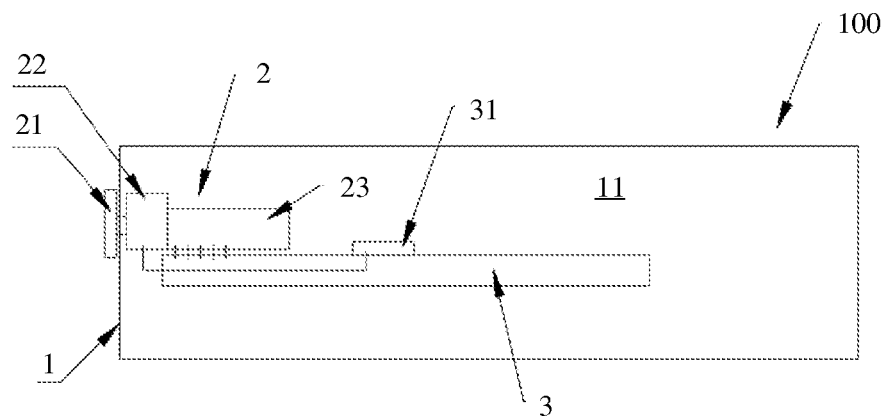
FIG. 2 is a schematic diagram of a power conversion apparatus according to an embodiment.

The switch may be an independent switch component disposed in the power supply system, or the switch may be disposed on a functional apparatus in the power supply system. For example, in an embodiment, the switch is disposed on the power conversion apparatus. As shown in FIG. 2, a power conversion apparatus 100 includes a housing 1, a switch 2, and a circuit board 3. The housing 1 surrounds accommodation space 11, the circuit board 3 is disposed in the accommodation space 11, the switch 2 includes a knob 21, a trip-free structure 22, and a contact component 23, the contact component 23 and the trip-free structure 22 are located in the accommodation space 11 and are electrically connected to the circuit board 3, and the knob 21 is located on one side of an outer surface of the housing 1. In an embodiment, a control unit 31 is disposed on the circuit board 3, the control unit 31 is electrically connected to the trip-free structure 22, and the control unit 31 is configured to send a switch-off signal to the trip-free structure 22, so that the trip-free structure 22 can drive the contact component 23 to be switched off.

Figure 3:
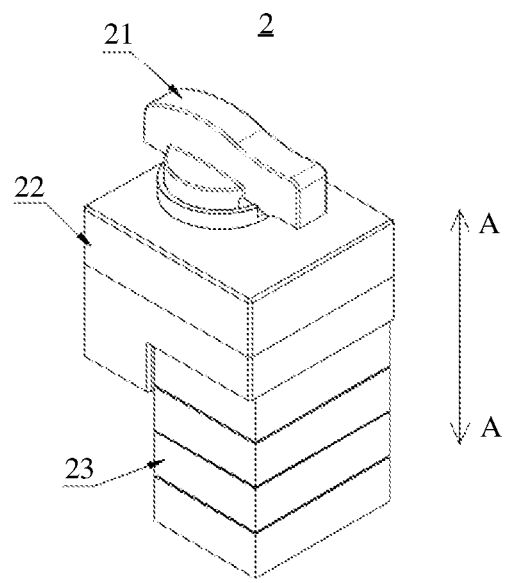
FIG. 3 is a schematic diagram of a switch according to an embodiment.
Figure 4:
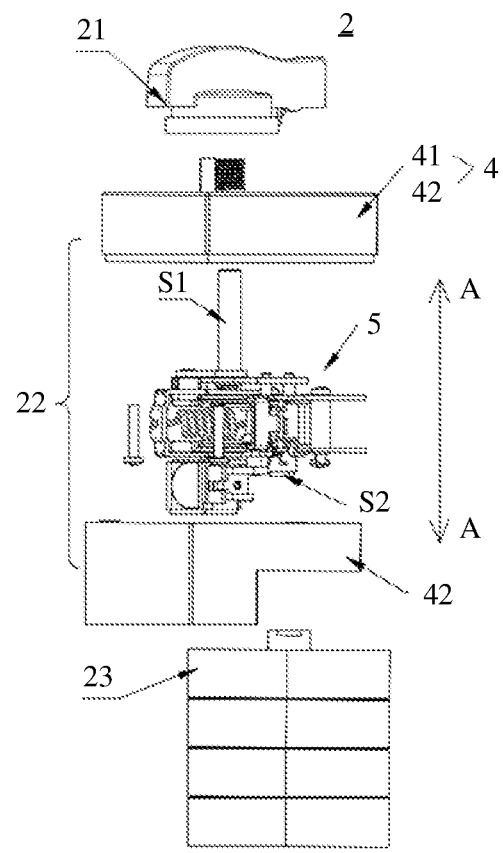
FIG. 4 is an exploded diagram of a switch according to an embodiment o.

FIG. 3 is a three-dimensional schematic diagram of a switch 2 according to an embodiment. FIG. 4 is an exploded diagram of the switch 2 according to an embodiment. As shown in FIG. 3 and FIG. 4, the switch 2 includes a knob 21, a trip-free structure 22, and a contact component 23. The trip-free structure 22 is disposed in a stacked manner between the knob 21 and the contact component 23 in a first direction A. The trip-free structure 22 includes a cover body 4 and a connecting rod mechanism 5 accommodated in the cover body 4. The cover body 4 includes an upper cover 41 and a lower cover 42. The upper cover 41 and the lower cover 42 are buckled with each other and jointly surround the connecting rod mechanism 5. The connecting rod mechanism 5 includes a knob rotating shaft 51 and a contact rotating shaft S2. The knob rotating shaft extends out of the cover body 4 from the upper cover 41, the knob rotating shaft 51 is configured to fixedly connect to the knob 21, the knob rotating shaft 51 can be rotated relative to the cover body 4, and an axial extension direction of the knob rotating shaft 51 is the first direction A. The contact rotating shaft S2 extends out of the cover body 4 from the lower cover 42, the contact rotating shaft S2 is configured to fixedly connect to the contact component 23, and an extension direction of a rotation center of the contact rotating shaft S2 is the first direction A. With reference to FIG. 2 and FIG. 4, in a state in which the switch 2 is assembled in a housing 1 of a power conversion apparatus 100, the trip-free structure 22 and the contact component 23 are accommodated in the housing 1. A surface that is of the trip-free structure 22 and that faces away from the contact component 23 may be in contact with an inner surface of the housing 1. A through hole is disposed on the housing 1, the knob rotating shaft 51 on the trip-free structure 22 extends out of the through hole, and the knob 21 is mounted on the knob rotating shaft 51 from one side of an outer surface of the housing 1.

In an embodiment, the extension directions of the contact rotating shaft S2 and the knob rotating shaft 51 are defined to be the same, the knob is rotated to drive the contact rotating shaft to be rotated, and a rotation direction of the knob and a rotation direction of the contact rotating shaft may be the same. Because a moving contact is inside the apparatus, the moving contact cannot be observed with naked eyes. In a process of operating the knob rotating shaft, a rotation direction of the moving contact can be intuitively learned by using the knob, thereby bringing better use experience. In addition, force is transferred between the knob and the moving contact by using a connecting rod structure, and therefore the structure is simple and ingenious and is easy to maintain.

Figure 5:
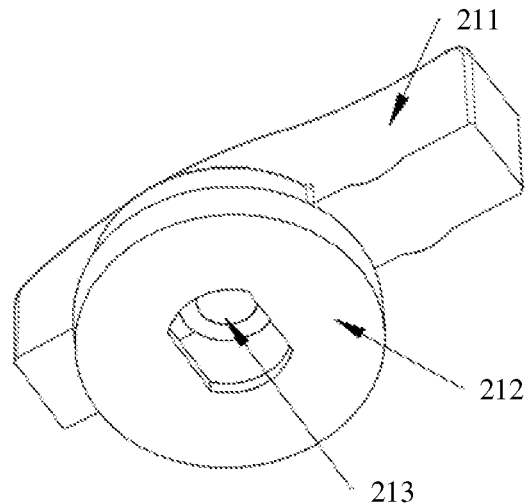
FIG. 5 is a schematic diagram of a knob of a switch according to an embodiment.

With reference to FIG. 3 and FIG. 5, in an embodiment, the knob 21 includes a handle 211 and a seat body 212. The seat body 212 is configured to connect the trip-free structure 22 and the knob rotating shaft S1. The handle 211 is connected to one side that is of the seat body 212 and that faces away from the cover body 4 of the trip-free structure 22. The handle 211 is used by a user to perform a manual operation and is configured to indicate statuses of the switch (a switch-on state, a switch-off state, and a fault state). As shown in FIG. 5, a mounting hole 213 is disposed on a surface that is of the seat body 212 and that faces the trip-free structure 22, and the knob rotating shaft 51 of the trip-free structure 22 extends out of the housing of the power conversion apparatus and is fastened to the mounting hole 213. The mounting hole 213 is located at a central location of the seat body 212. The seat body 212 may be flat cylindrical. The first direction A is at an axial direction of the seat body 212. The handle 211 extends in a strip shape in a radial direction of the seat body 212 and extends out of an outer edge of the seat body 212.

Figure 6:
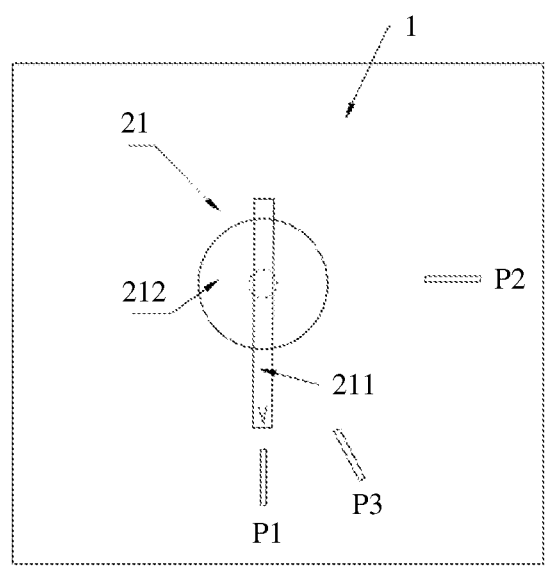
FIG. 6 is a schematic diagram of a knob of a switch and an outer surface of a housing of a power conversion apparatus according to an embodiment.

As shown in FIG. 6, in an embodiment, on one side of the outer surface of the housing 1 of the power conversion apparatus, three locations are set around the knob 21, namely, a first location P1, a second location P2, and a third location P3. The central location of the seat body 212 is a circle center, an included angle between a radial direction of the first location P1 and a radial direction of the second location P2 is 90 degrees, and the third location P3 is between the first location P1 and the second location P2. When the switch is in a manual switch-on state, the knob 21 is located at the first location P1 (an edge of the handle 211 may point to the first location P1 in this state); when the switch is in a manual switch-off state, the knob 21 is located at the second location P2 (the edge of the handle 211 may point to the second location P2 in this state); or when a circuit fault occurs, the switch is in a tripping state, and in this case, the knob is located at the third location P3 (the edge of the handle 211 may point to the third location P3 in this state). An arrow-like mark may be set on an outer surface of the handle 211, and a state of the switch may be indicated by using a corresponding indication relationship between the arrow and the first location P1, between the arrow and the second location P2, and between the arrow and the third location P3.

In this embodiment, the knob rotating shaft 51 is disposed on a mounting plate 222, and the knob rotating shaft 51 is connected to a transmission member 521 by using a connecting rod mechanism 525. This can reduce a rotation angle of the knob rotating shaft 51 and is conducive to controlling a rotation angle of the knob 21 within a suitable range. The connecting rod mechanism 525 is also referred to as a connection unit, and the connecting rod mechanism 525 may use an integral rod-like or sheet-like transmission structure solution or may use a gear fitting transmission solution. As shown in FIG. 6, in an embodiment, in a manual switch-on or switch-off process of the switch, the rotation angle of the knob 21 is greater than or equal to 50 degrees, and the rotation angle of the knob 21 is large, and therefore a switch-on or switch-off location and trip location may be easily identified. In an embodiment, the rotation angle of the knob 21 is 90 degrees, and the rotation angle being 90 degrees complies with a conventional operation habit. In this way, desirable user experience can be provided.

Figure 7:
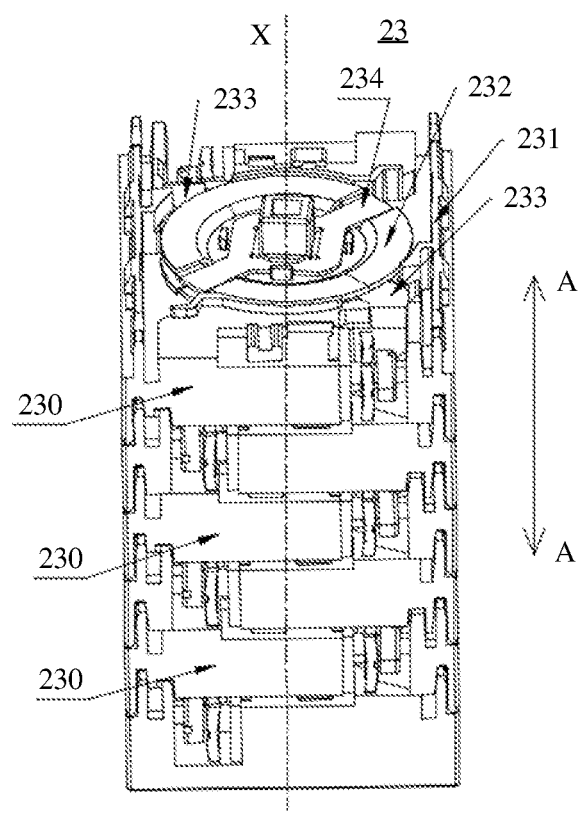
FIG. 7 is a schematic diagram of a contact component of a switch according to an embodiment.
Figure 8:
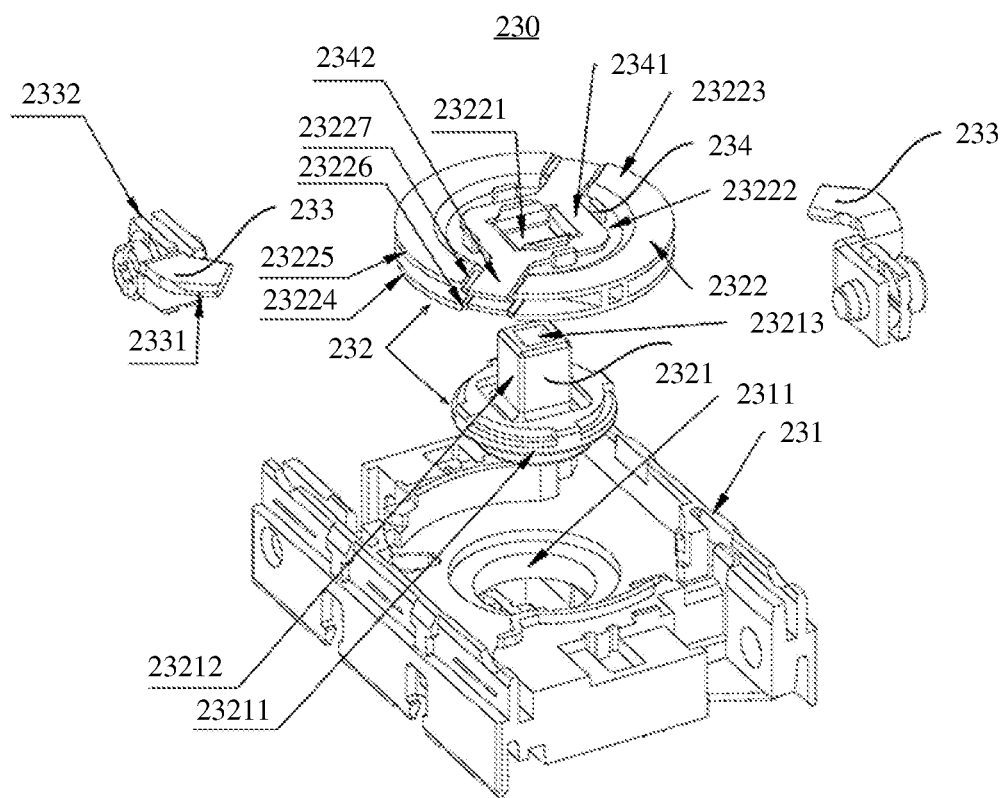
FIG. 8 is an exploded diagram of a contact unit in a contact component of a switch according to an embodiment.

In this embodiment, movement of the connecting rod structure 522 drives the contact rotating shaft S2 to be rotated, and a rotation angle range of the contact rotating shaft S2 may be greater than or equal to 50 degrees. In other words, the moving contact 234 is rotated on a plane perpendicular to a central shaft of a movable part of the contact component by using the central shaft as a center, and a rotation angle of the moving contact 234 is greater than or equal to 50 degrees. In this embodiment, the rotation angle of the moving contact 234 can be limited to a range greater than or equal to 50 degrees, so that the rotation angle of the moving contact 234 may be large, and an arc blowout is easily implemented, thereby ensuring safety of a power supply system. As shown in FIG. 7 and FIG. 8, in an embodiment, the rotation angle of the moving contact 234 is 90 degrees; and for each contact unit, two fixed contacts 233 exist on a periphery of the moving contact 234 and are distributed 180 degrees around the central shaft of the movable part on a same circumference. A most suitable location is a location at which the rotation angle of the moving contact 234 is 90 degrees. The location is at an equal distance or an equal angle from the two fixed contacts 233. In the switch provided in this embodiment, in the manual switch-on or switch-off process, the rotation angle of the knob 21 is consistent with the rotation angle of the moving contact 234.

As shown in FIG. 7, the contact component 23 includes a plurality of contact units 230 disposed in a stacked manner in the first direction A, and the plurality of contact units 230 are sequentially stacked and are spliced together to form a whole. For each contact unit 230, the contact unit 230 includes a fixed part 231 and a movable part 232, and the movable part 232 is rotatably connected to the fixed part 231. The fixed part 231 is provided with a fixed contact 233, and the movable part 232 is provided with a moving contact 234. The movable part 232 has a central shaft X. The central shaft X extends in the first direction A. The movable part 232 is capable of being rotated by using the central shaft X as a center, to enable the moving contact 234 and the fixed contact 233 to be switched on or switched off.

FIG. 8 is an exploded diagram of a contact unit 230. The fixed part 231 can be understood as a square base architecture, and a central through hole 2311 is disposed at a central location of the fixed part 231. The fixed contact 233 is mounted at an edge location of the fixed part 231. The fixed contact 233 may be fastened to the fixed part 231 in a fastening manner such as fastening using a buckle or a screw. In an embodiment, there are two fixed contacts 233. In a circumferential direction, the two fixed contacts 233 are symmetrically distributed on a periphery of the central through hole 2311. The two fixed contacts 233 may be disposed on the periphery of the central through hole 2311 in a 180-degree rotational symmetry distribution manner. The fixed contact 233 includes an inner connecting part 2331 facing the central through hole 2311 and an outer connecting part 2332 located between an outer edge of the fixed part 231 and the inner connecting part 2331. The inner connecting part 2331 is of a sheet-like structure, and the inner connecting part 2331 is configured to fit in with the moving contact 234 to implement a circuit connection. The outer connecting part 2332 is configured to electrically connect to a circuit board of the power conversion apparatus. The outer connecting part 2332 may be configured to connect to an electric wire, one end of the electric wire may be electrically connected to the outer connecting part 2332, and the other end of the electric wire may be electrically connected to the circuit board.

Figure 9:
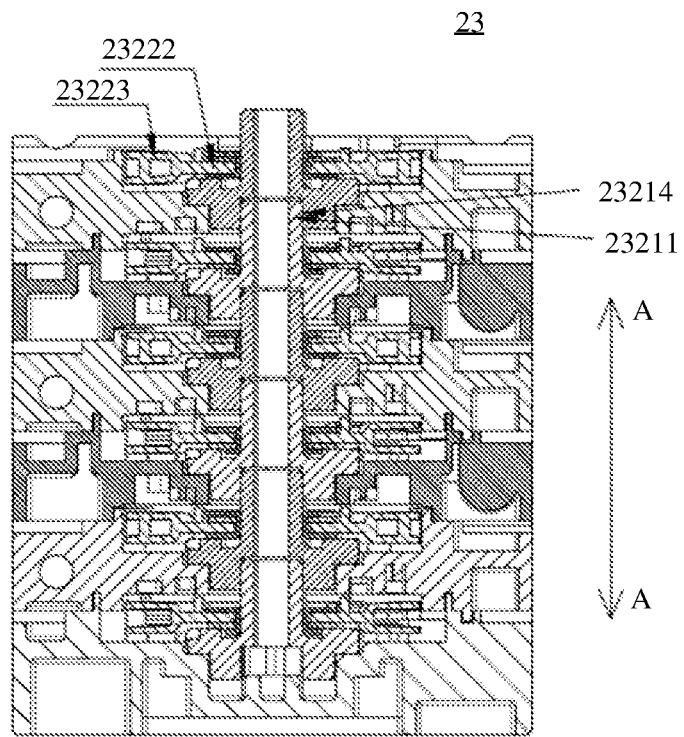
FIG. 9 is a schematic diagram of a cross-section of a contact component of a switch according to an embodiment.

The movable part 232 is rotatably connected to a location of the central through hole 2311 of the fixed part 231. The movable part 232 includes a first rotating member 2321 and a second rotating member 2322. The first rotating member 2321 includes a base 23211 and a rotating shaft structure 23212. The movable part 232 is of a centrosymmetric structure, and the central shaft of the movable part 232 is a central shaft of the rotating shaft structure 23212. The rotating shaft structure 23212 is fixedly connected to the base 23211 and is disposed in a protruding manner from a surface of the base 23211. The base 23211 is configured to fit in with the central through hole 2311 of the fixed part 231, and the base 23211 is rotatably connected to the fixed part 231. By matching a size of a radial periphery of the base 23211 with a size of the central through hole 2311, the base 23211 is rotatably mounted in the central through hole 2311 and can be rotated in the central through hole 2311 by using the central shaft of the movable part 232 as a rotation center. On the surface of the base 23211, a direction in which the rotating shaft structure 23212 protrudes and extends is the first direction, and an extension direction of the central shaft of the movable part 232 is also the first direction. A rotating shaft structure 23212 in a contact unit 230 adjacent to the trip-free structure 22 is configured to fixedly connect to the contact rotating shaft S2 of the trip-free structure 22, and a rotating shaft structure 23212 of another contact unit 230 is configured to fixedly connect to a base 23211 of an adjacent contact unit 230. A fastening hole 23213 may be disposed on the rotating shaft structure 23212, the fastening hole 23213 may be formed by being recessed from an end face that is of the rotating shaft structure 23212 and that faces away from the base 23211, and the fastening hole 23213 may be configured to fit in with the contact rotating shaft S2 of the trip-free structure 22. As shown in FIG. 9, a fastening hole 23214 is disposed on the base 23211, the fastening hole 23214 of the base 23211 is formed by being recessed from an end face that is of the base 23211 and that faces away from the rotating shaft structure 23212, and the rotating shaft structure 23212 is inserted into the fastening hole 23214 of the base 23211, to implement a fixed connection between movable parts 232 of the two adjacent contact units 230.

The second rotating member 2322 is fixedly connected to the first rotating member 2321. In an embodiment, a fastening through hole 23221 is disposed at a central location of the second rotating member 2322, and the second rotating member 2322 is sleeved on the rotating shaft structure 23212 of the first rotating member 2321. The fixed connection between the first rotating member 2321 and the second rotating member 2322 is implemented by making the fastening through hole 23221 fit in with the rotating shaft structure 23212. The fastening through hole 23221 may be square-shaped, and the rotating shaft structure 23212 may be square columnar. The second rotating member 2322 is of a disk-like structure, the second rotating member 2322 includes an intermediate region 23222 and an edge region 23223, the edge region 23223 is disposed around a periphery of the intermediate region 23222, and the fastening through hole 23221 is located at the center of the intermediate region 23222. The intermediate region 23222 is of a plate-shaped structure, the edge region 23223 includes a first plate 23224 and a second plate 23225 spaced from each other, and a gap is formed between the first plate 23224 and the second plate 23225. In an axial direction (the first direction) of the second rotating member 2322, the first plate 23224 and the second plate 23225 are stacked and spaced from each other. In a radial direction of the second rotating member 2322, the intermediate region 23222 faces a middle location of the gap between the first plate 23224 and the second plate 23225. A first notch 23226 is disposed on the first plate 23224, and a second notch 23227 is disposed on the second plate 23225. The first notch 23226 faces the second notch 23227 in the axial direction of the second rotating member 2322. The moving contact 234 is fixedly connected to a surface of the intermediate region 23222, and a part of the moving contact 234 extends into the first notch 23226 and the second notch 23227. The moving contact 234 may include an assembling part 2341 and a fitting part 2342. The assembling part 2341 is fixedly connected to the intermediate region 23222 of the second rotating member 2322. The fitting part 2342 is configured to fit in with or separate from the inner connecting part 2331 of the fixed contact 233 to implement switch-on or switch-off. In an embodiment, the fitting part 2342 has an architecture with a pair of clamping pieces for clamping the inner connecting part 2331. The pair of clamping pieces extend into locations of the first plate 23224 and the second plate 23225 from locations of and the second notch 23227 and the first notch 23226, respectively. In terms of clamping the inner connecting part 2331 by the fitting part 2342, the fitting part 2342 has elastic deformation, and clamps the inner connecting part 2331 of the fixed contact 233 by elastic force.

Figure 10:
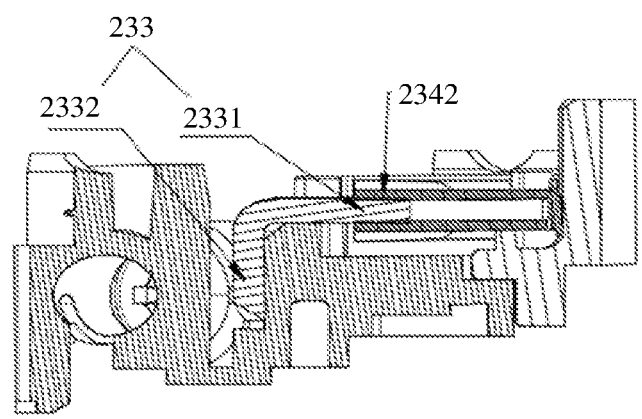
FIG. 10 is a schematic diagram of a partial cross-section of a moving contact and a fixed contact in a contact component of a switch that are in a switch-on state according to an embodiment.
Figure 11:
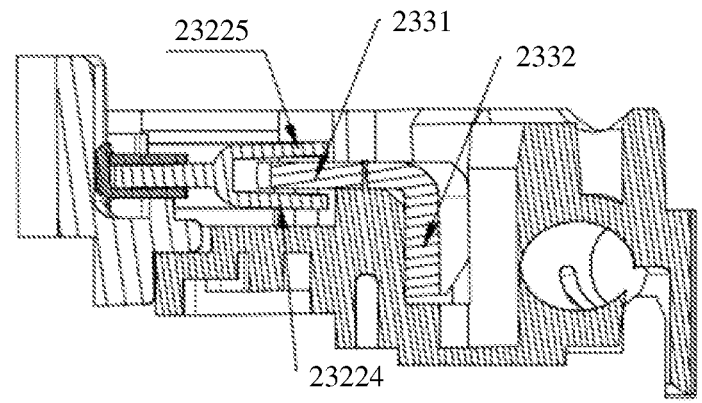
FIG. 11 is a schematic diagram of a partial cross-section of a moving contact and a fixed contact in a contact component of a switch that are in a switch-off state according to an embodiment.

As shown in FIG. 10 and FIG. 11, the inner connecting part of the fixed contact 233 extends into the gap between the first plate 23224 and the second plate 23225. As shown in FIG. 10, when the movable part 232 is rotated to the fitting part 2342 of the moving contact 234 and encounters the inner connecting part 2331, the fitting part 2342 clamps the inner connecting part 2331 of the fixed contact 233, and the fitting part 2342 and the inner connecting part 2331 form an electrical connection. This state is a switch-on state of the switch. As shown in FIG. 11, when the movable part 232 is rotated so that the fitting part 2342 of the moving contact 234 is separated from the inner connecting part 2331 of the fixed contact 233, the inner connecting part 2331 is between the first plate 23224 and the second plate 23225, and gaps are formed respectively between two surfaces of the inner connecting part 2331 and the first plate 23224 and the second plate 23225. This state may be a switch-off state of the switch.

Figure 12:
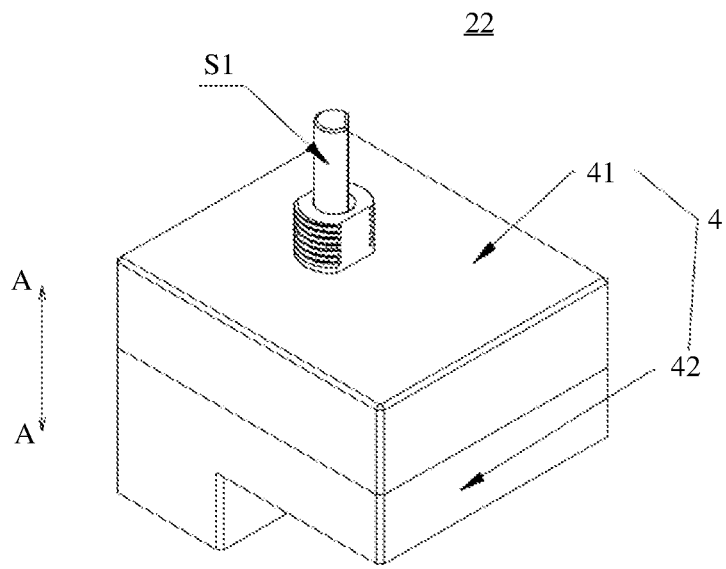
FIG. 12 is a schematic diagram of a trip-free structure of a switch according to an embodiment.
Figure 13:
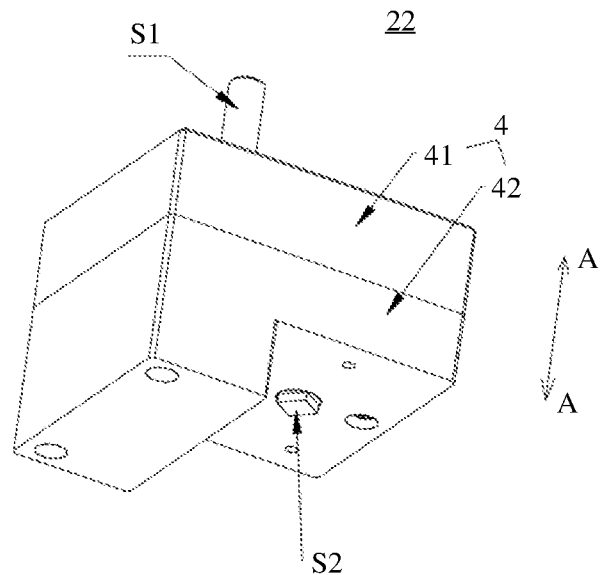
FIG. 13 is a schematic diagram of a trip-free structure of a switch in another direction according to an embodiment.

With reference to FIG. 12 and FIG. 13, the cover body 4 of the trip-free structure 22 is internally provided with the connecting rod mechanism. The upper cover 41 and the lower cover 42 of the cover body 4 are buckled with each other. The upper cover 41 may be fixedly connected to the lower cover 42 by using a fastener, or the upper cover 41 may be fixedly connected to the lower cover 42 by using an adhesive. The knob rotating shaft 51 of the connecting rod mechanism 5 extends out of the cover body 4 from the upper cover 41, and the contact rotating shaft S2 of the connecting rod mechanism 5 extends out of the cover body 4 from the lower cover 42. The contact rotating shaft S2 is configured to fixedly connect to the movable part 232 of the contact component 23, which can also be understood as follows: The contact rotating shaft S2 is fixedly connected to the moving contact 234. In this way, a rotation process of the contact rotating shaft S2 can drive the moving contact 234 to be rotated around the central shaft X of the contact component 23 (referring to FIG. 7).

Figure 14:
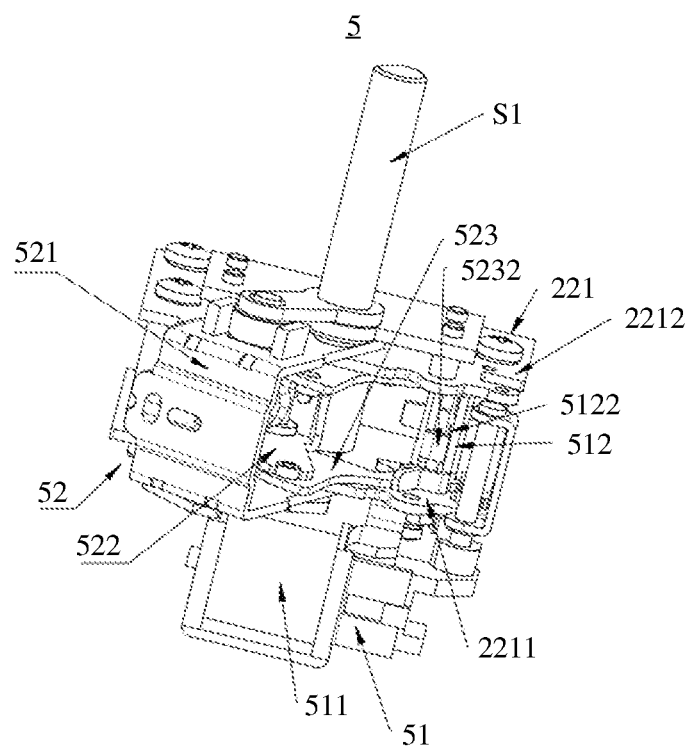
FIG. 14 is a schematic diagram of a linkage structure of a trip-free structure of a switch according to an embodiment.
Figure 15:
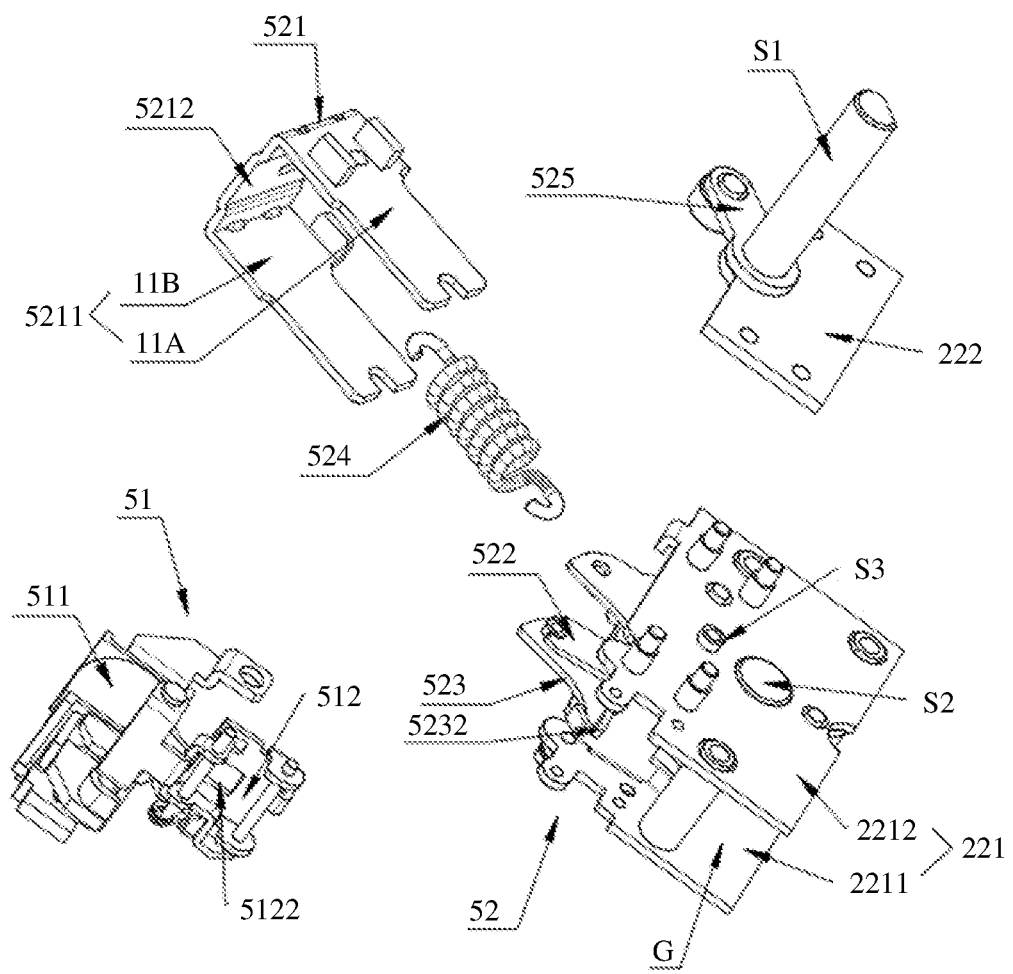
FIG. 15 is an exploded diagram in one direction of FIG. 14.
Figure 16:
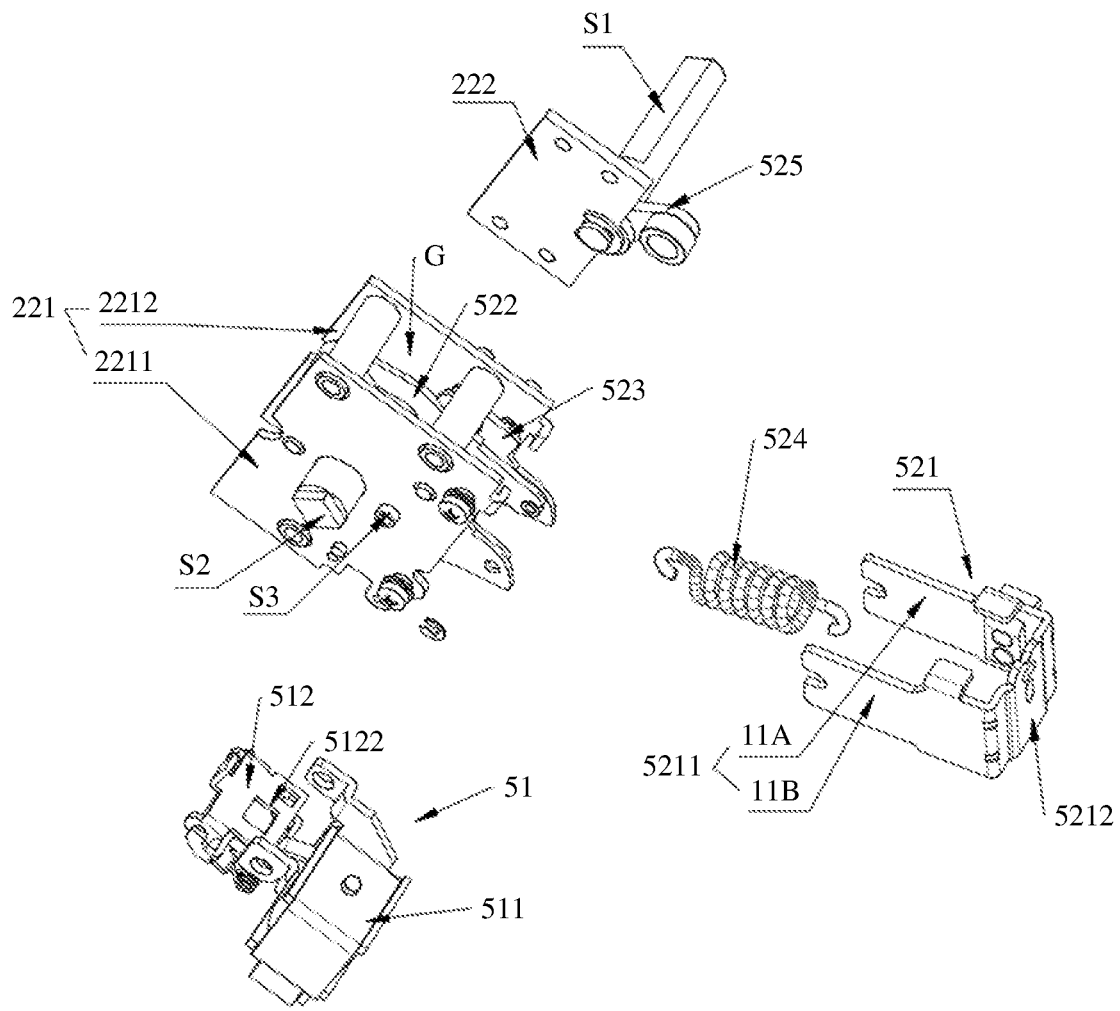
FIG. 16 is an exploded diagram in another direction of FIG. 14.
Figure 17:
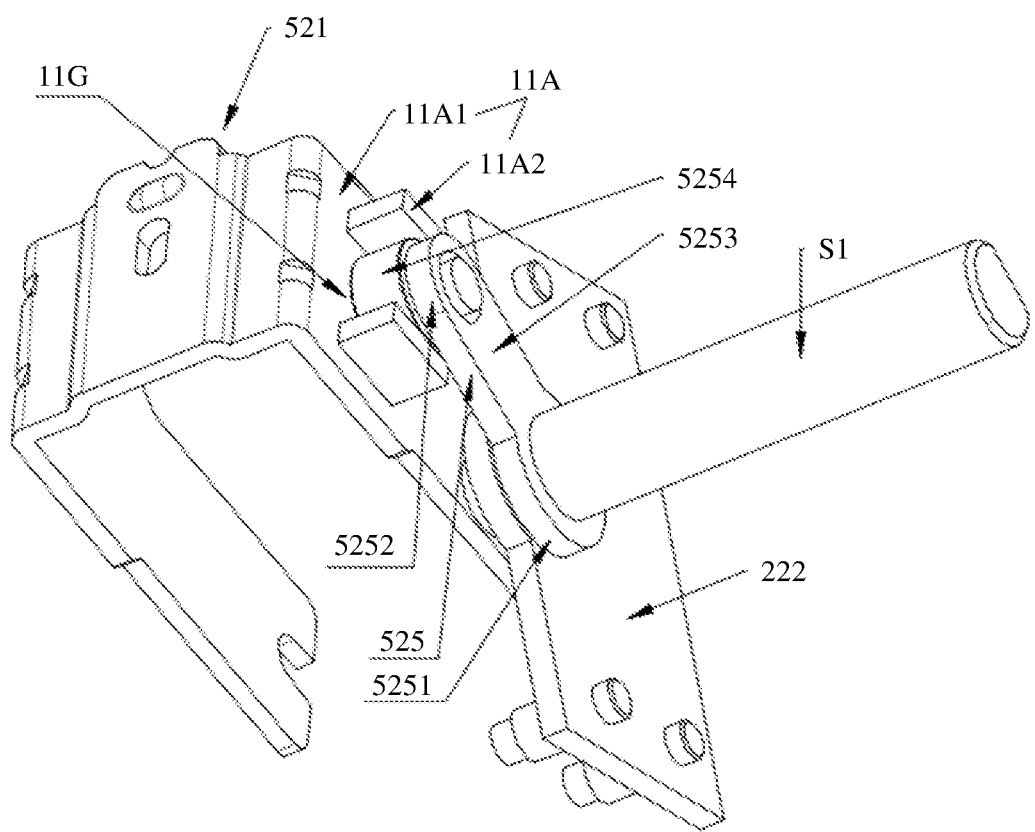
FIG. 17 is a schematic diagram of a connection structure between a transmission member and a knob rotating shaft in a linkage structure of a trip-free structure of a switch according to an embodiment.

FIG. 14 is a three-dimensional diagram of the connecting rod mechanism 5, and FIG. 15 and FIG. 16 are two three-dimensional exploded diagrams of the connecting rod mechanism 5. The connecting rod mechanism 5 includes a trip unit 51 and a transmission structure 52. The trip unit 51 is electrically connected to a control unit in the power supply system and is configured to receive a switch-off signal sent by the control unit. The trip unit 51 is buckled with or unlocked from the transmission structure 52. When receiving the switch-off signal from the control unit, the trip unit 51 can be unlocked from the transmission structure 52, so that the switch is switched to a tripping state and the switch implements automatic circuit opening in a fault state, that is, implements a trip-free function.

The trip unit 51 includes an electromagnet 511 and a latch 512. A connecting piece (for example, a connecting piece similar to the connecting rod structure 522 or a gear transmission structure) may be disposed between the electromagnet 511 and the latch 512. The electromagnet 511 drives the latch 512 to move, and the latch 512 is configured to be buckled with or unlocked from the transmission structure 52. In this embodiment, the switch-off signal sent by the control unit to the trip unit 51 is an electrical signal and is used to drive the electromagnet 511 to work, thereby driving the latch 512 to move. A buckle hole 5122 is disposed on the latch 512, and the buckle hole 5122 is configured to be buckled with a buckle structure on the transmission structure 52.

In an embodiment, for the switch that has implemented automatic circuit opening, the knob may be operated to implement re-buckling between the trip unit 51 and the transmission structure 52, that is, the knob may be manually operated to drive the transmission structure 52 to move to be buckled with the trip unit 51. In the solution, by rotating the knob, a re-buckling action after trip free is completed. The knob is used for manual switch-on or switch-off and can also be used for a re-buckling process, and no other driving structure needs to be disposed in the switch to drive re-buckling between a cradle and the trip unit. This is conducive to ensuring a compact structure and a miniaturized volume of the switch. In other embodiments, an automatic control apparatus may be alternatively disposed to implement re-buckling. For example, an electromagnet 511 used for switch-on is disposed to drive the transmission structure 52 to move to be buckled with the trip unit 51.

In an embodiment, the transmission structure 52 includes the knob rotating shaft 51, the transmission member 521, the connecting rod structure 522, the cradle 523, an elastic member 524, and the contact rotating shaft S2. As shown in FIG. 14 and FIG. 15, the cradle 523 includes the buckle structure 5232, and the buckle structure 5232 is configured to be buckled with the buckle hole 5122. The connecting rod structure 522 is connected between the cradle 523 and the contact rotating shaft S2, and the contact rotating shaft S2 is fixedly connected to the movable part 232 of the contact component 23.

In an embodiment, the trip-free structure 22 includes a mounting bracket 221 and the mounting plate 222, the mounting bracket 221 is disposed in a stacked manner between the contact component 23 and the mounting plate 222 in the first direction, the mounting bracket 221 is configured to assemble the transmission member 521, the cradle 523, the connecting rod structure 522, and the contact rotating shaft S2, and the mounting plate 222 is configured to assemble the knob rotating shaft 51. It can be understood that in this embodiment, the knob rotating shaft 51 and the contact rotating shaft S2 are disposed on the mounting plate 222 and the mounting bracket 221, respectively. The knob rotating shaft 51 is connected to the transmission member 521 by using a connection structure, and the transmission member 521 drives the connecting rod structure 522 to move. When the knob 21 is stuck and cannot be rotated, the trip unit 51 can drive the cradle 523 to drive the connecting rod structure 522 to move and drive the moving contact 234 and the fixed contact 233 to separate from each other.

The transmission member 521 and the mounting bracket 221 are connected to a location of a transmission rotating shaft S3, the knob rotating shaft 51 is rotatably connected to the mounting plate 222, and the knob 21 is fastened to the knob rotating shaft 51 and is located on one side that is of the mounting plate 222 and that is away from the mounting bracket 221. In the trip-free structure 22, the transmission structure 52 further includes the connecting rod mechanism 525. The connecting rod mechanism 525 is also referred to as a connection unit. The connection unit is connected between the knob rotating shaft 51 and the transmission member 521 to transfer force. The connecting rod mechanism 525 is fixedly connected to the knob rotating shaft 51. The connecting rod mechanism 525 fits in with the transmission member 521, so that in a rotation process of the knob 21, the connecting rod mechanism 525 is capable of driving the transmission member 521 to swing by using the transmission rotating shaft S3 as a center.

The transmission member 521 includes swing arms 5211 and a connecting arm 5212, a part of the swing arm 5211 is disposed in a stacked manner between the mounting bracket 221 and the mounting plate 222 in the first direction, and the swing arms 5211 fit in with the connecting rod mechanism 525 so that the connecting rod mechanism 525 is capable of driving the transmission member 521 to move. There may be two swing arms 5211: a first arm 11A and a second arm 11B. The first arm 11A is disposed in a stacked manner between the mounting bracket 221 and the mounting plate 222 in the first direction. The second arm 11B is disposed in a stacked manner in the first direction on one side that is of the mounting bracket 221 and that is away from the mounting plate 222. The first arm 11A and the second arm 11B are located on a top surface and a bottom surface of the mounting bracket 221, respectively. The connecting arm 5212 is bent relative to the swing arms 5211, and the connecting arm 5212 is located on one side edge of the mounting bracket 221 (the side edge of the mounting bracket 221 can be understood as a portion connected between the top surface and the bottom surface).

Accommodation space G is enclosed by the mounting bracket 221. The mounting bracket 221 may include a bottom plate 2211 and a top plate 2212 that are disposed opposite to each other, the bottom plate 2211 and the top plate 2212 may be stacked and spaced from each other in the first direction, and the accommodation space G may be formed between the bottom plate 2211 and the top plate 2212. The cradle 523 and the connecting rod structure 522 are disposed in the accommodation space G and are rotatably connected to the mounting bracket 221. The electromagnet 511 of the trip unit 51 is mounted on the bottom plate 2211 and is located on one side that is of the bottom plate 2211 and that is away from the top plate 2212, and the latch 512 of the trip unit 51 is located between the bottom plate 2211 and the top plate 2212. The contact rotating shaft S2 is rotatably connected to the mounting bracket 221 and extends out of the accommodation space G from the side that is of the bottom plate 2211 and that is away from the top plate 2212, and the knob rotating shaft S2 is located on one side that is of the top plate 2212 and that is away from the bottom plate 2211.

At least a part of the connecting arm 5212 faces the accommodation space G, one end of the elastic member 524 is fixedly connected to the connecting arm 5212, and the other end of the elastic member 524 extends into the accommodation space G and is connected to the connecting rod structure 522. The connecting arm 5212 is connected between the first arm 11A and the second arm 11B, one end of the connecting arm 5212 is connected to an edge of the first arm 11A, and the other end of the connecting arm 5212 is connected to an edge of the second arm 11B. The mounting bracket 221 and an edge location that is of the first arm 11A and that is away from the connecting arm 5212 are rotatably connected to a location of the transmission rotating shaft S3, and the mounting bracket 221 and an edge location that is of the second arm 11B and that is away from the connecting arm are rotatably connected to a location of the transmission rotating shaft S3, which can be understood as follows: A rotating shaft rotatably connected between the first arm 11A and the mounting bracket 221 and a rotating shaft rotatably connected between the second arm 11B and the mounting bracket 221 are coaxial and are both the transmission rotating shaft S3.

Figure 18:
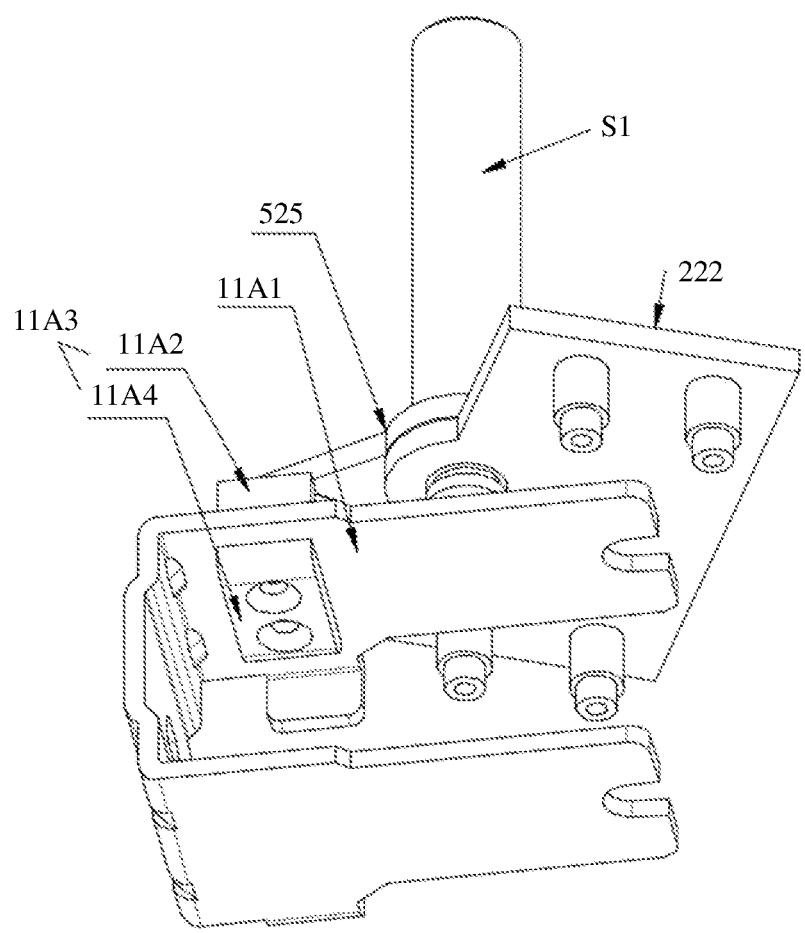
FIG. 18 is a schematic diagram in another direction of FIG. 17.
Figure 19:
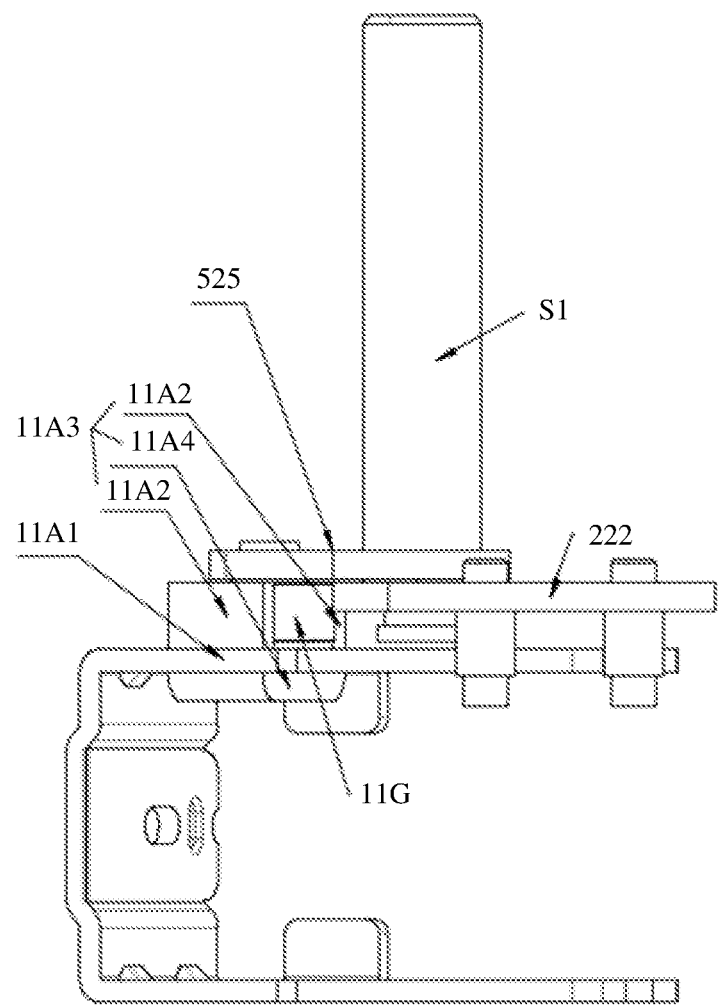
FIG. 19 is a plan view of FIG. 17.
Figure 20:
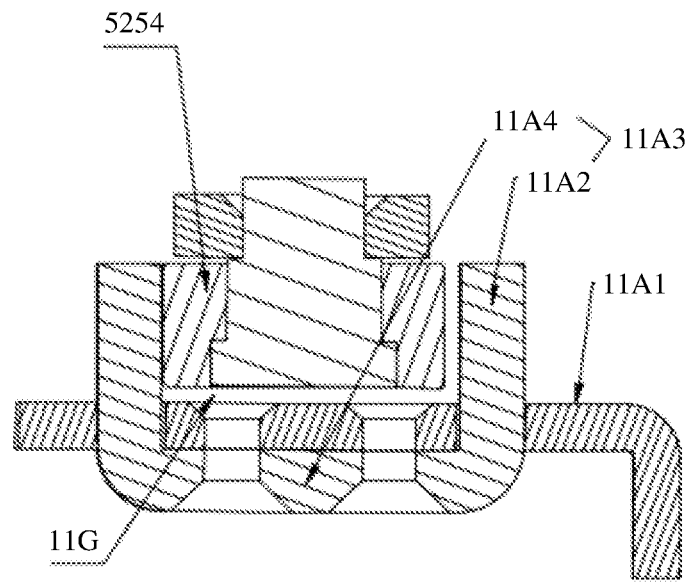
FIG. 20 is a diagram of a partial cross-section of a connection structure between a transmission member and a knob rotating shaft in a linkage structure of a trip-free structure of a switch according to an embodiment.

As shown in FIG. 17, FIG. 18, FIG. 19, and FIG. 20, in an embodiment, fitting space 11G for accommodating a part of the connecting rod mechanism 525 is disposed on the first arm 11A of the swing arms 5211, the part of the connecting rod mechanism 525 is located in the fitting space 11G and can move in the fitting space 11G, and the connecting rod mechanism 525 abuts against an inner surface of the fitting space 11G, so that the connecting rod mechanism 525 drives the transmission member 521 to swing around the transmission rotating shaft S3. The first arm 11A may include a plate-shaped main body 11A1 and a pair of limiting blocks 11A2 may be disposed in a protruding manner on a surface of the plate-shaped main body 11A1, and a region between the pair of limiting blocks 11A2 may be the fitting space 11G.I In an embodiment, as shown in FIG. 18 and FIG. 20, the first arm 11A may include a plate-shaped main body 11A1 and a limiting clamp 11A3. The limiting clamp 11A3 is U-shaped, and the limiting clamp 11A3 includes a pair of limiting blocks 11A2 and a connecting block 11A4. The connecting block 11A4 is connected between the pair of limiting blocks 11A2. A pair of through holes are disposed on the plate-shaped main body 11A1, and the pair of limiting blocks 11A2 respectively pass through the pair of through holes. The connecting block 11A4 is fastened to the plate-shaped main body 11A1 by using a fastener, for example, by using a screw. The connecting block 11A4 is located on a bottom surface of the plate-shaped main body 11A1. The pair of limiting blocks 11A2 protrude from a top surface of the plate-shaped main body 11A1 after passing through the through holes and form the fitting space 11G on the top surface of the plate-shaped main body 11A1.

In an embodiment, the connecting rod mechanism 525 includes a first end 5251 and a second end 5252, the first end 5251 is fixedly connected to the knob rotating shaft S1, and the second end 5252 fits in with the transmission member 521. In a rotation process of the knob rotating shaft S1, the second end 5252 moves circumferentially by using a central shaft of the knob rotating shaft S1 as a center. The connecting rod mechanism 525 is configured to: in the rotation process of the knob rotating shaft S1, apply driving force in a circumferential direction to the transmission member 521, and drive the transmission member 521 to swing around the transmission rotating shaft S3.

The connecting rod mechanism 525 includes a main body part 5253 and a fitting part 5254, the main body part 5253 is of an integral structure and is strip-shaped sheet-like or rod-like, and the first end 5251 and the second end 5252 of the connecting rod mechanism 525 are two opposite ends of the main body part 5253. In an embodiment, the fitting part 5254 is rotatably connected to the main body part 5253, an outer surface of a part that is of the fitting part 5254 and that extends into the fitting space 11G may be a cylindrical surface or an arc surface, and the fitting part 5254 may be of a flat cylindrical structure or a spherical structure. A rotating connection structure between the fitting part 5254 and the main body part 5253 facilitates a smoother process in which the knob rotating shaft 51 is rotated to drive the fitting part 5254 of the connecting rod mechanism 525 to move in the fitting space 11G, and no jam situation occurs. It can be understood from FIG. 20 that, in a state in which one side of the fitting part 5254 is in contact with the inner surface of the fitting space 11G, a gap is disposed between the other side of the fitting part 5254 and the inner surface of the fitting space 11G. Disposing the gap can ensure that a location of the fitting part 5254 is not limited or interfered with by the limiting blocks 11A2 in a process in which the connecting rod mechanism 525 drives the transmission member 521 to swing. If arc-shaped sliding space is enclosed by the limiting blocks 11A2, it means that the fitting part 5254 needs to slide along the arc-shaped sliding space. This imposes a requirement on precision and difficulty control, and a high requirement on assembly tolerance fitting in an assembly process. Therefore, the fitting part 5254 may move in the fitting space 11G in order to reduce design difficulty and precision requirements, reduce a requirement on assembly precision, and reduce fabrication costs.

Figure 21A:
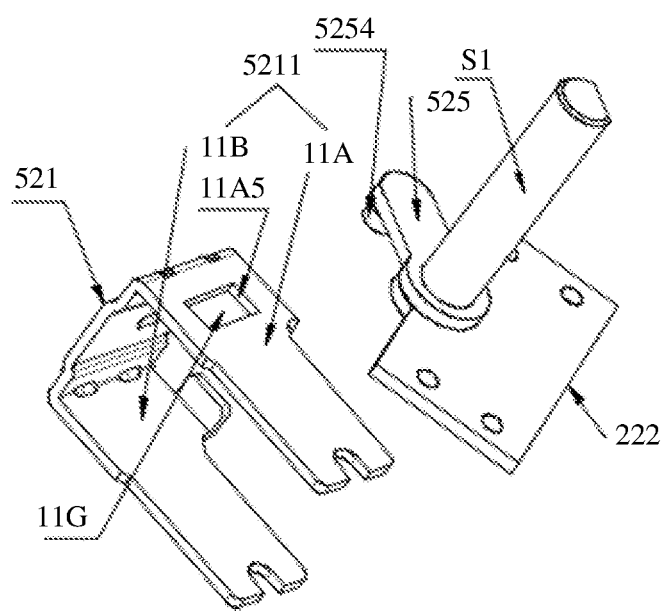
FIG. 21A is a schematic diagram of a connection structure between a transmission member and a knob rotating shaft in a linkage structure of a trip-free structure of a switch according to an embodiment.
Figure 21B:
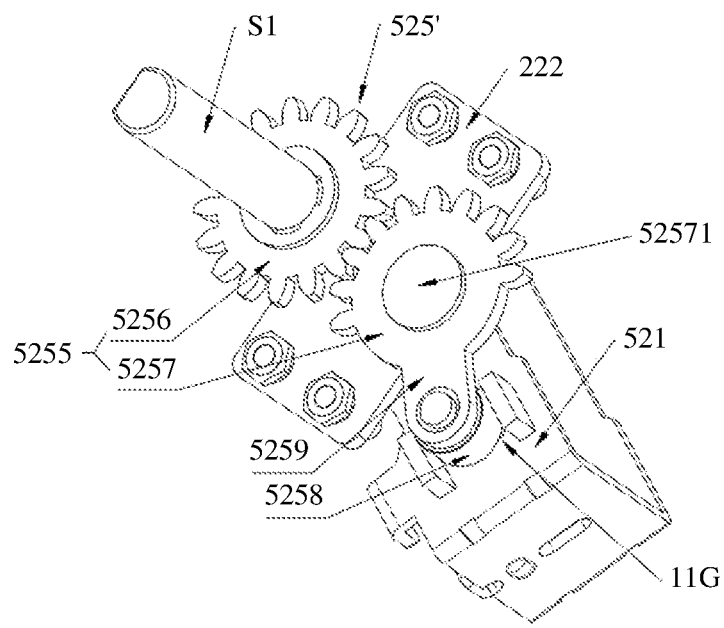
FIG. 21B is a schematic diagram of a connection structure between a transmission member and a knob rotating shaft in a linkage structure of a trip-free structure of a switch according to an embodiment.
Figure 21C:
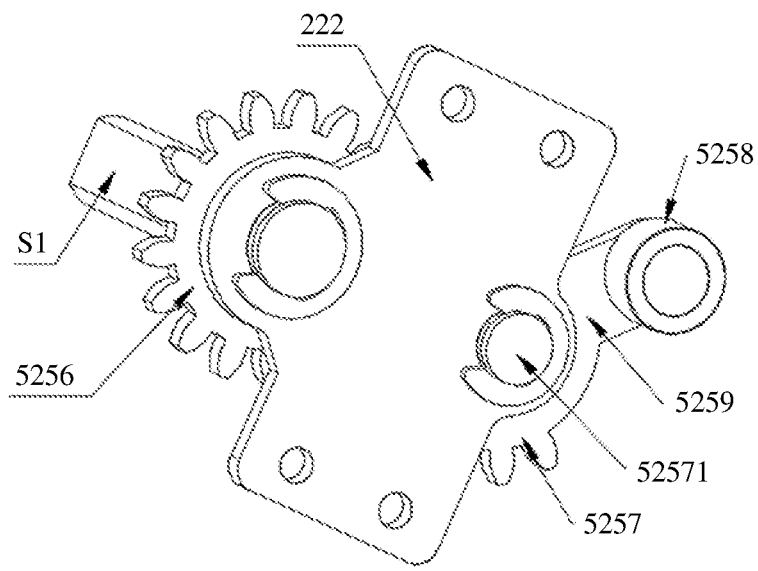
FIG. 21C is a schematic diagram observed from the other side of a mounting plate according to the embodiment shown in FIG. 21B.

As shown FIG. 21A, in other embodiments, a sliding slot 11A5 may be disposed on the first arm 11A of the swing arms 5211, and an area in the sliding slot 11A5 is the fitting space 11G. The fitting part 5254 of the connecting rod mechanism 525 is mounted in the sliding slot 11A5, and a size of the fitting part 5254 is less than space in the sliding slot 11A5, so that the fitting part 5254 can move in the sliding slot 11A5. In this way, in the rotation process of the knob rotating shaft 51, the fitting part 5254 abuts against an inner wall of the sliding slot 11A5, so that the connecting rod mechanism 525 can drive the transmission member 521 to swing. The sliding slot 11A5 may be in a shape of a through hole or a blind hole.

In the embodiments shown in FIG. 17 to FIG. 21A, the connection unit connected between the transmission member 521 and the knob rotating shaft 51 is of a connecting rod mechanism-type structure, and the main body part of the connection unit is of an integral sheet-like or rod-like structure. In another embodiment, the connection unit connected between the transmission member 521 and the knob rotating shaft 51 uses a gear transmission solution. As shown in FIG. 21B and FIG. 21C, a connection unit 525' may include a main body part 5255 and a fitting part 5258. The main body part 5255 includes a driving gear 5256 and a transmission gear 5257, the driving gear 5256 is fixedly connected to the knob 51, the transmission gear 5257 is rotatably connected to the mounting plate 222 at a location of a rotating shaft 52571, the transmission gear 5257 meshes with the driving gear 5256, a periphery of the transmission gear 5257 includes a transmission arm 5259, the transmission arm 5259 is connected to the fitting part 5258, the fitting part 5258 is located in the fitting space 11G, and the fitting part 5258 abuts against the inner surface of the fitting space 11G, so that the connection unit 525' drives the transmission member 521 to move. The fitting part 5258 is rotatably connected to the transmission arm 5259, that is, the fitting part 5258 can be rotated freely relative to the transmission arm 5259 by using a fixed rotating shaft as a center.

Figure 22:
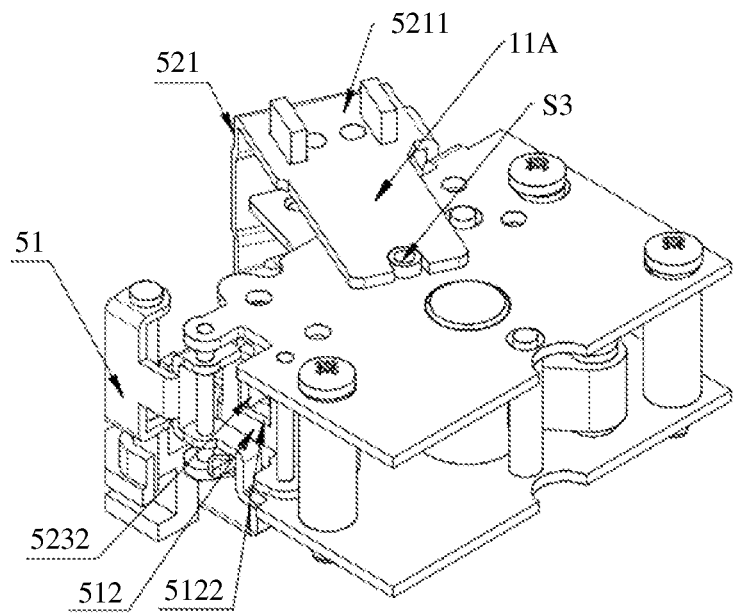
FIG. 22 is a schematic diagram of connecting a transmission member and a trip unit in a linkage structure of a trip-free structure of a switch to a mounting bracket according to an embodiment.
Figure 23:
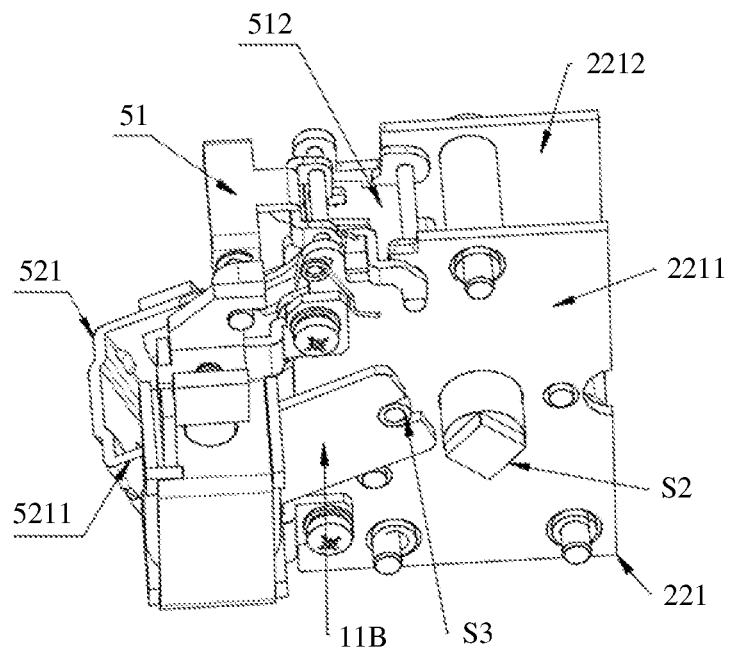
FIG. 23 is a schematic diagram in another direction of FIG. 22.
Figure 25:
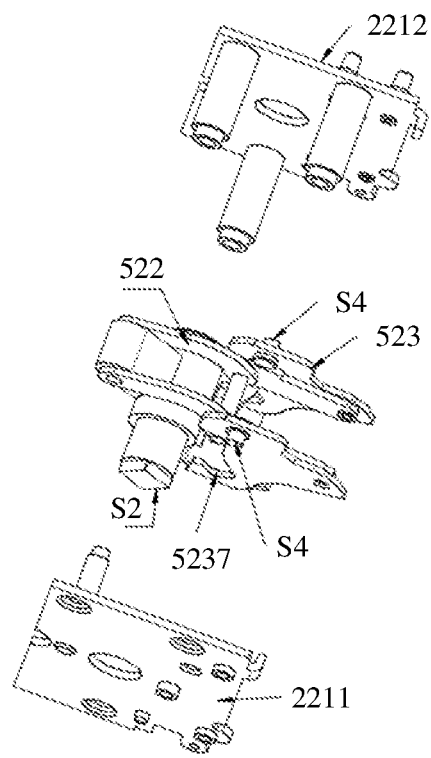
FIG. 25 is a three-dimensional exploded diagram in one direction of FIG. 24.
Figure 26:
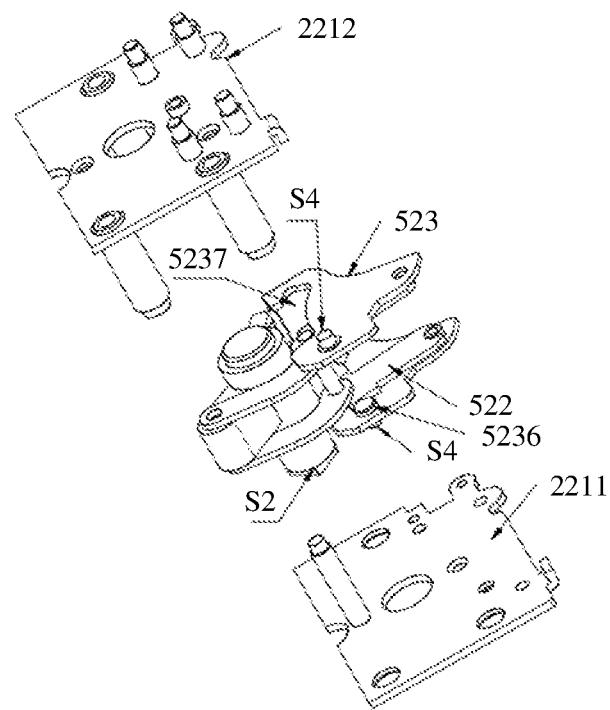
FIG. 26 is a three-dimensional exploded diagram in another direction of FIG. 24.
Figure 27:
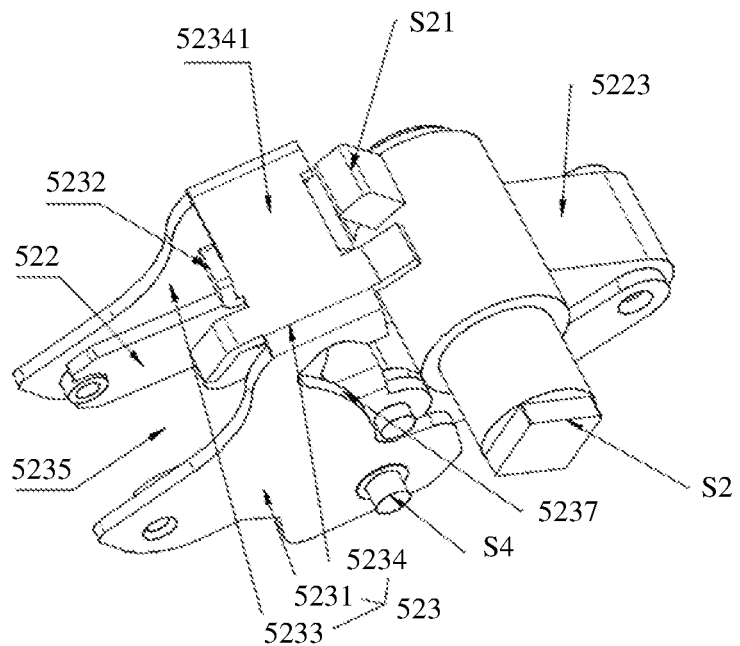
FIG. 27 is a schematic diagram of assembly of a cradle and a connecting rod structure in a trip-free structure of a switch according to an embodiment.
Figure 28:
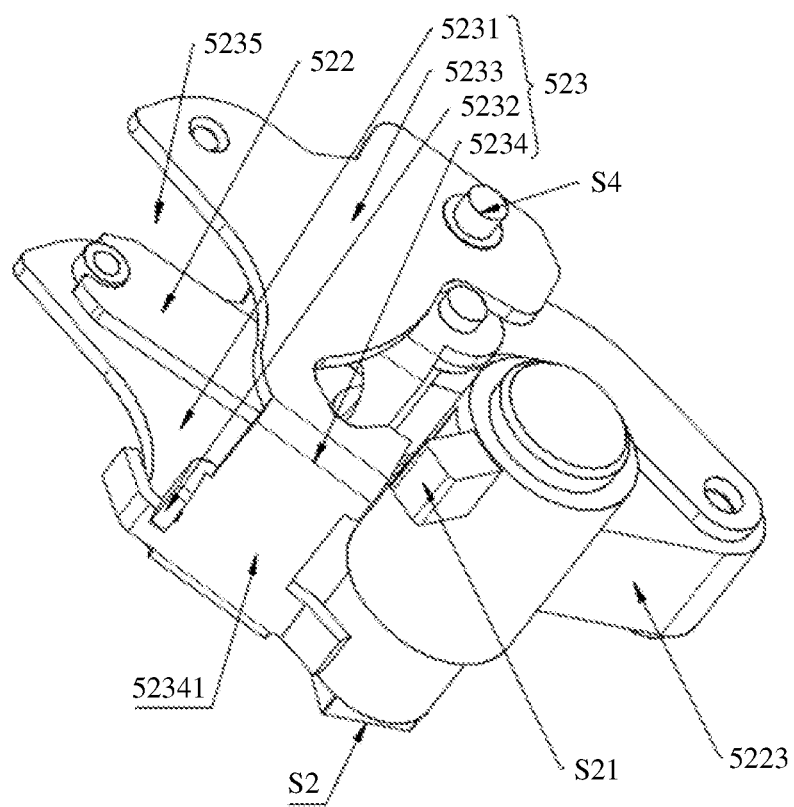
FIG. 28 is a schematic diagram in another direction of FIG. 27.
Figure 29:
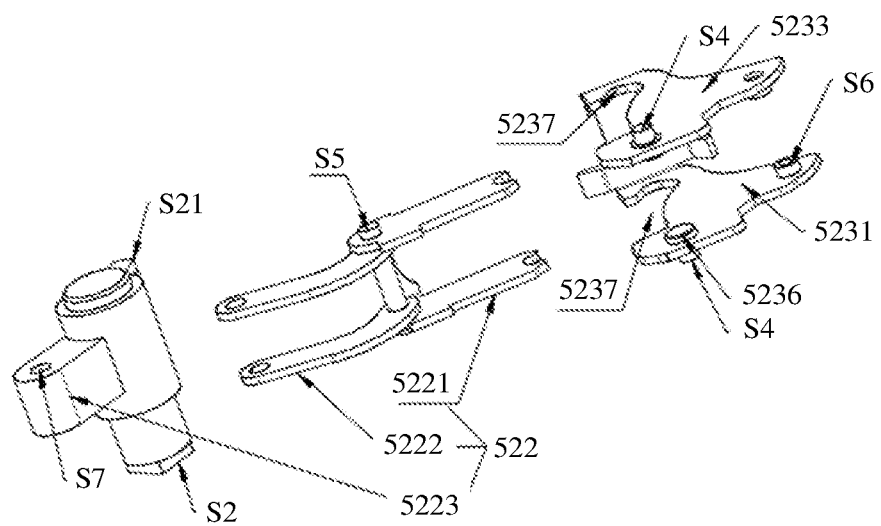
FIG. 29 is a three-dimensional exploded diagram of a cradle and a connecting rod structure in a trip-free structure of a switch according to an embodiment.
Figure 30:
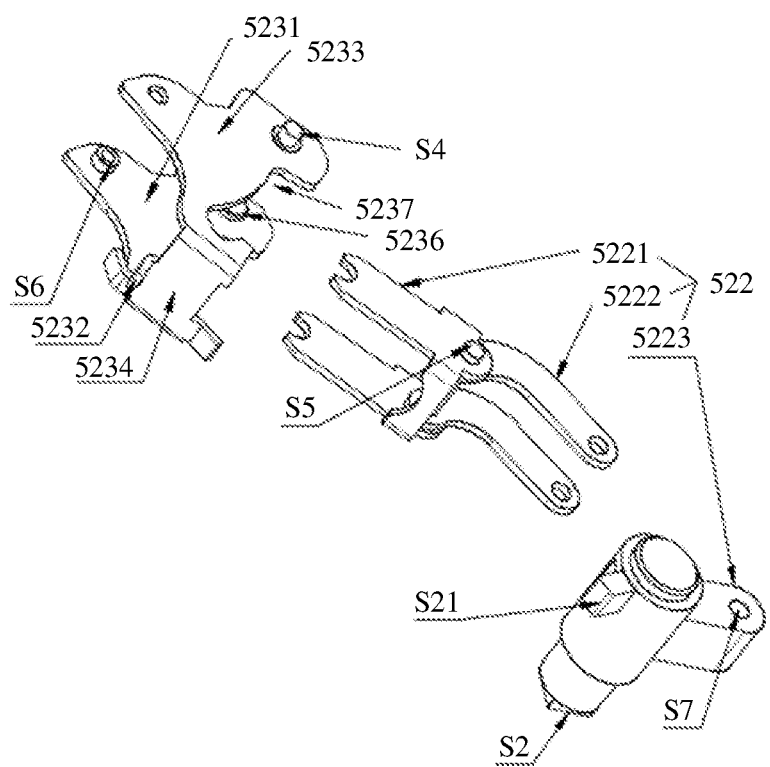
FIG. 30 is a three-dimensional exploded diagram in another direction of FIG. 29.

As shown in FIG. 22 and FIG. 23, the first arm 11A of the swing arms 5211 in the transmission member 521 is rotatably connected to the top plate 2212 of the mounting bracket 221 at the location of the transmission rotating shaft S3, and the second arm 11B of the swing arms 5211 in the transmission member 521 is rotatably connected to the bottom plate 2211 at the location of the transmission rotating shaft S3. The latch 512 of the trip unit 51 is rotatably connected to the mounting bracket 221 by using a rotating shaft, and the latch 512 is located between the top plate 2212 and the bottom plate 2211 and is rotatably connected to edge locations of the top plate 2212 and the bottom plate 2211. In FIG. 22 and FIG. 23, the cradle 523 and the connecting rod structure 522 are sandwiched between the top plate 2212 and the bottom plate 2211, and a connection structure cannot be seen. FIG. 24 to FIG. 30 can clearly show forms of the cradle 523 and the connecting rod structure 522 and a connection relationship between the cradle 523 and the connecting rod structure 522. FIG. 25 and FIG. 26 are exploded diagrams of a structure shown in FIG. 24 in two directions. FIG. 27 and FIG. 28 are two three-dimensional diagrams of the cradle 523 and the connecting rod structure 522 in an assembled state. FIG. 29 and FIG. 30 are exploded diagrams of the cradle 523 and the connecting rod structure 522 in two directions.

Structural forms of the cradle 523 and the connecting rod structure 522 and a connection relationship between the cradle 523 and the connecting rod structure 522 can be clearly understood with reference to FIG. 24, FIG. 25, FIG. 26, FIG. 27, FIG. 28, FIG. 29, and FIG. 30. The cradle 523 includes a first transfer plate 5231, a second transfer plate 5233, and a connecting plate 5234 connected between the two transfer plates. The first transfer plate 5231 and the second transfer plate 5233 are disposed opposite to each other, and assembly space 5235 is formed between the two transfer plates. This assembly space 5235 is configured to accommodate the connecting rod structure 522. The connecting plate 5234 is connected between an edge of the first transfer plate 5231 and an edge of the second transfer plate 5233. The first transfer plate 5231 and the second transfer plate 5233 have a same structural form. The first transfer plate 5231 is rotatably connected to the bottom plate 2211 of the mounting bracket 221 by using a cradle rotating shaft S4, and the second transfer plate 5233 is rotatably connected to the top plate 2212 of the mounting bracket 221 by using a cradle rotating shaft S4. The cradle rotating shaft S4 on the bottom plate 2211 and the cradle rotating shaft S4 on the top plate 2212 are collinear (coaxially disposed). In a process in which the cradle 523 is rotated relative to the mounting bracket 221, the cradle 523 is rotated by using the cradle rotating shaft S4 as a center. A switch-on limiting structure 5236 is disposed on the cradle rotating shaft S4. The switch-on limiting structure 5236 is configured to abut against the connecting rod structure 522. When the switch is in a manual switch-on state, the connecting rod structure 522 is in contact with the switch-on limiting structure 5236, to restrict the movement of the connecting rod structure 522, thereby limiting the moving contact 234 to be in the manual switch-on state. Because the cradle rotating shaft S4 is disposed on the mounting bracket 221, in the manual switch-on or switch-off process, the cradle 523 and the mounting bracket 221 are relatively stationary, that is, the cradle rotating shaft and the mounting bracket 221 are relatively fixed. It can be understood that the switch-on limiting structure 5236 provided in this embodiment is disposed on the mounting bracket 221.

A groove 5237 is disposed on the edge of the first transfer plate 5231, and a groove 5237 is disposed on the edge of the second transfer plate 5233. The two grooves 5237 have a same structural form, and the two grooves 5237 are disposed opposite to each other in an axial direction of the cradle rotating shaft S4. The axial direction of the cradle rotating shaft S4 can be understood as a direction of a vertical connection line between the first transfer plate 5231 and the second transfer plate 5233. The groove 5237 of the cradle 523 is configured to fit in with the connecting rod structure 522 to limit the connecting rod structure 522 when the switch is in a manual switch-off state, that is, limit a location of the moving contact 234.

Figure 24:
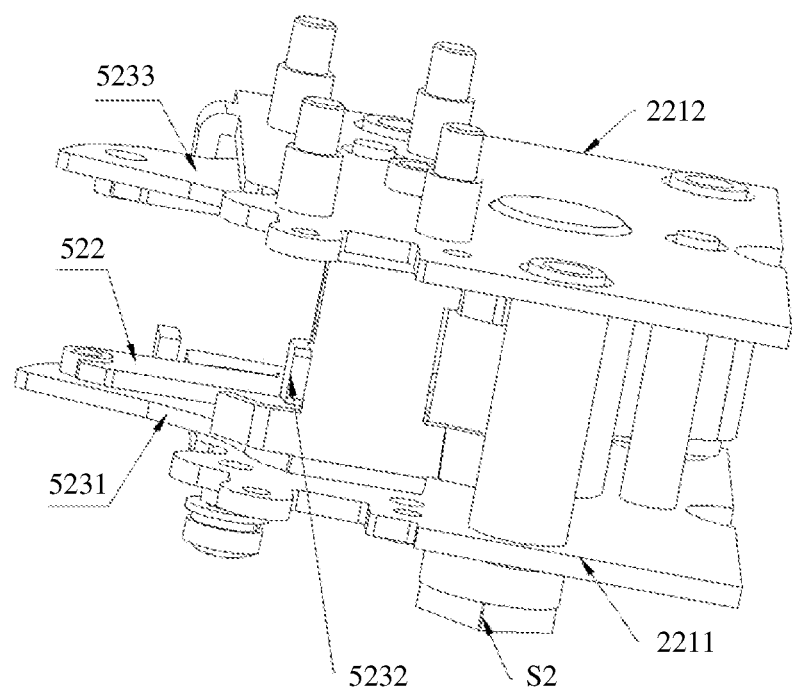
FIG. 24 is a schematic diagram in which a cradle and a connecting rod structure are mounted on a mounting bracket in a linkage structure of a trip-free structure of a switch according to an embodiment.

As shown in FIG. 24, the first transfer plate 5231 is in contact with the bottom plate 2211 of the mounting bracket 221, and the second transfer plate 5233 is in contact with the top plate 2212 of the mounting bracket 221, so that the cradle 523 is stably connected between the bottom plate 2211 and the top plate 2212. In the process in which the cradle 523 is rotated relative to the mounting bracket 221, the first transfer plate 5231 is attached to the bottom plate 2211 and slides along a surface of the bottom plate 2211, and the second transfer plate 5233 is attached to the top plate 2212 and slides along a surface of the top plate 2212. This can ensure stability of movement of the cradle 523 and stability of connections and the movement of the connecting rod structure 522 in a tripping process of the switch.

As shown in FIG. 27 and FIG. 28, the connecting plate 5234 of the cradle 523 includes a plate body 52341 and a buckle structure 5232 that is bent and extends from an edge of the plate body 52341. The plate body 52341 is configured to connect the first transfer plate 5231 and the second transfer plate 5233. Using the plate body 52341 as a basis, a bending direction of the buckle structure 5232 is opposite to a bending direction of the first transfer plate 5231. The connecting rod structure 522 is located between the first transfer plate 5231 and the second transfer plate 5233, and the connecting rod structure 522 and the buckle structure 5232 are respectively located on two sides of the plate body 52341.

The buckle structure 5232 is configured to fit in with the buckle hole 5122 of the latch 512 of the trip unit 51 to implement fitting (buckling) between the cradle 523 and the trip unit 51. In a process of unlocking the trip unit 51 from the cradle 523, the cradle 523 drives the connecting rod structure 522 to move, to separate the moving contact 234 from the fixed contact 233. In this embodiment, through fitting between the cradle 523 and the connecting rod structure 522, a linkage path between the trip unit 51 and the moving contact 234 is that the cradle 523 drives the connecting rod structure 522 to move and the connecting rod structure 522 drives the moving contact 234 to move, and the knob rotating shaft is completely free of this linkage path. In this way, in a tripping process of the switch, even if the knob rotating shaft is stuck, the movement of the connecting rod structure 522 is not affected. Therefore, in this embodiment, when the knob is stuck or blocked, the switch can still complete automatic circuit opening in a fault state.

As shown in FIG. 29 and FIG. 30, the connecting rod structure 522 includes an upper connecting rod 5221, a lower connecting rod 5222, and a main shaft 5223. One end of the upper connecting rod 5221 is rotatably connected to the cradle 523, the other end of the upper connecting rod 5221 is rotatably connected to one end of the lower connecting rod 5222 by using a first rotating shaft S5, and the other end of the lower connecting rod 5222 is rotatably connected to one end of the main shaft 5223. The upper connecting rod 5221 and the cradle 523 are rotatably connected to a location of a second rotating shaft S6, the second rotating shaft S6 is fixedly connected to the cradle 523, and the upper connecting rod 5221 can swing by using the second rotating shaft S6 as a fulcrum. The first rotating shaft S5 between the upper connecting rod 5221 and the lower connecting rod 5222 is in a free state relative to the mounting bracket 221 and the cradle 523. In other words, there is no connection relationship between the first rotating shaft S5 and the mounting bracket 221 or between the first rotating shaft S5 and the cradle 523. The lower connecting rod 5222 is rotatably connected to the main shaft 5223 by using a third rotating shaft S7. The third rotating shaft S7 is in a free state relative to the mounting bracket 221 and the cradle 523. In other words, there is no connection relationship between the third rotating shaft S7 and the mounting bracket 221 or between the third rotating shaft S7 and the cradle 523.

For the cradle 523, a center of the second rotating shaft S6, a center of the cradle rotating shaft S4, and any point on the buckle structure 5232 may form an acute triangle. In the solution, the cradle 523 with a small size can be obtained. Disposing an internal structure of the switch in small space is conducive to miniaturization of the switch.

Figure 31:
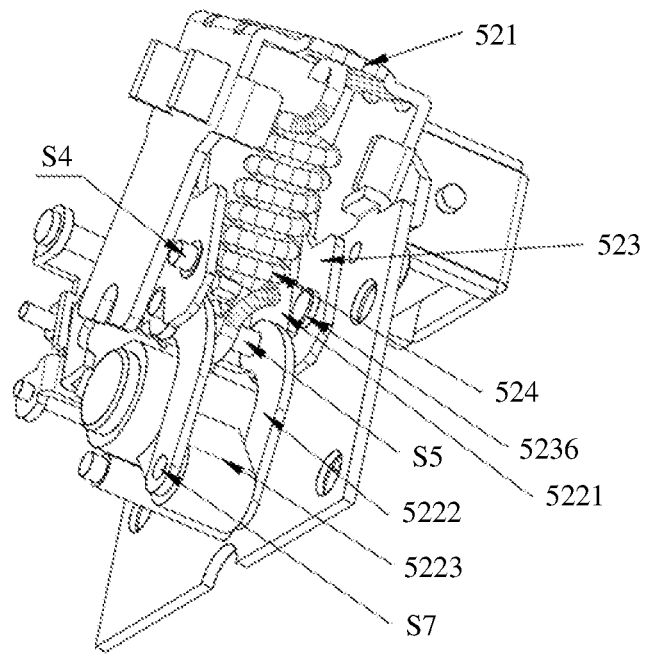
FIG. 31 is a partial schematic diagram of a linkage structure of a trip-free structure of a switch according to an embodiment and shows a connection structure of an elastic member.

As shown in FIG. 31, the first rotating shaft S5 is configured to connect the elastic member 524. As shown in FIG. 31, one end of the elastic member 524 is fastened at a location of the first rotating shaft S5, and the other end of the elastic member 524 is fastened to the transmission member 521. In this way, movement of the transmission member 521 can drive the connecting rod structure 522 to move.

Figure 32:
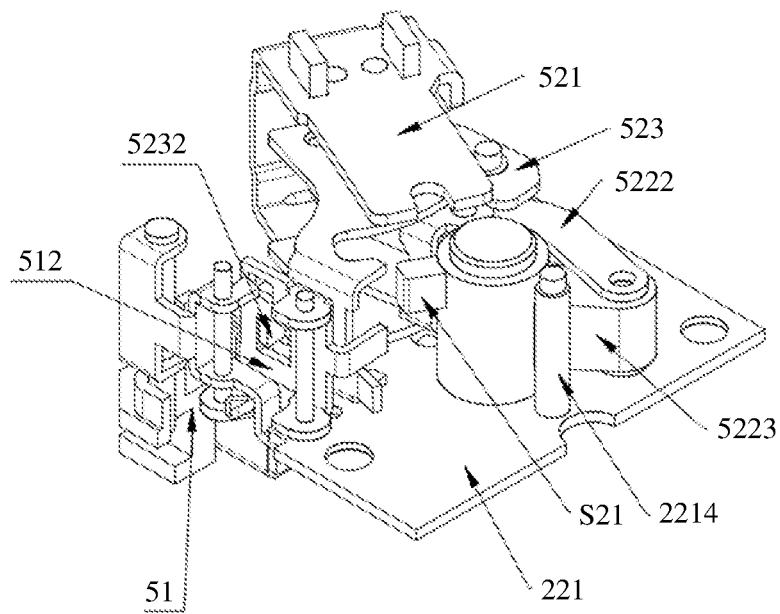
FIG. 32 is a partial schematic diagram of a linkage structure of a trip-free structure of a switch according to an embodiment and shows structures of a cradle and a connecting rod structure.

As shown in FIG. 29 and FIG. 30, the main shaft 5223 is fixedly connected to the contact rotating shaft S2, and the two shafts may be of an integral structure. It can also be understood that the main shaft 5223 is fixedly connected to the moving contact 234, and the main shaft 5223 can be rotated relative to the mounting bracket 221, to drive the moving contact 234 to be rotated. In this embodiment, limiting blocks S21 are disposed in a protruding manner on a periphery of the contact rotating shaft S2, or it can be understood that the limiting blocks S21 are fixedly connected to the main shaft 5223. As shown in FIG. 32, a trip limiting structure 2214 is disposed on the mounting bracket 221. The limiting blocks S21 abut against the trip limiting structure 2214 in a process in which the trip unit 51 drives the moving contact 234 and the fixed contact 233 to separate from each other, to limit the contact rotating shaft S2, so that the moving contact 234 is in a still state in a re-buckling process. In the solution, an electric arc caused by movement of the moving contact 234 in the re-buckling process can be avoided. In this embodiment, two fixed contacts 233 in a contact unit are distributed 180 degrees around a circumference on a periphery of the central shaft, and a location at which a rotation angle of the moving contact 234 is 90 degrees is an optimal location of the moving contact 234 in a switch-off state. Therefore, at a trip location, a location of the moving contact 234 may be rotated by 90 degrees. In this state, the moving contact 234 is farthest from the fixed contacts 233. This avoids the movement of the moving contact 234 in the re-buckling process and avoids an occurrence of a particular rotation phenomenon of the moving contact 234, thereby avoiding an occurrence of an electric arc.

Figure 33:
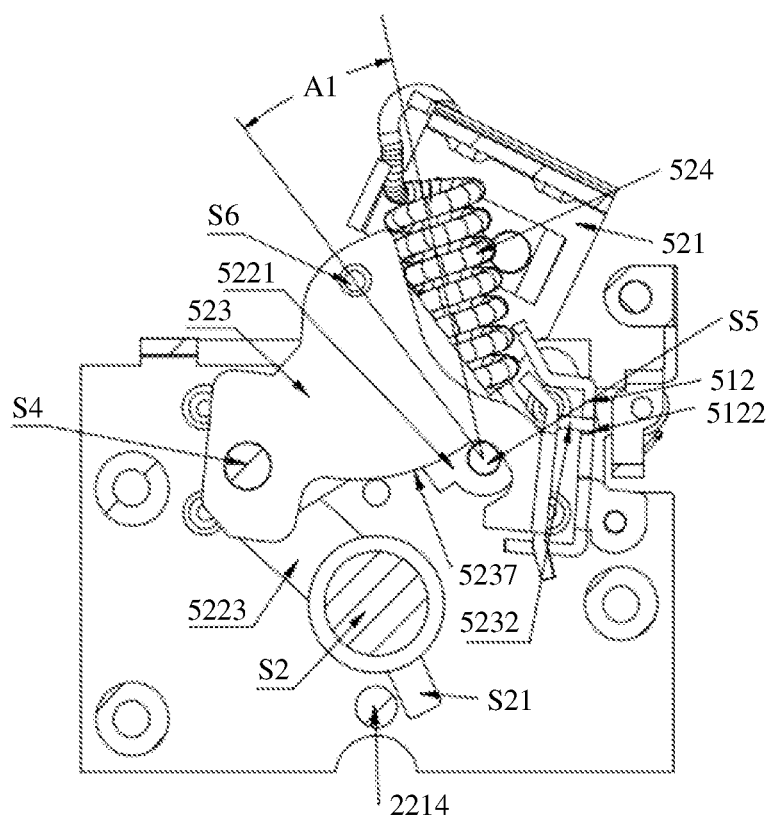
FIG. 33 is a schematic diagram of a trip-free structure of a switch in a manual switch-off state according to an embodiment.
Figure 34:
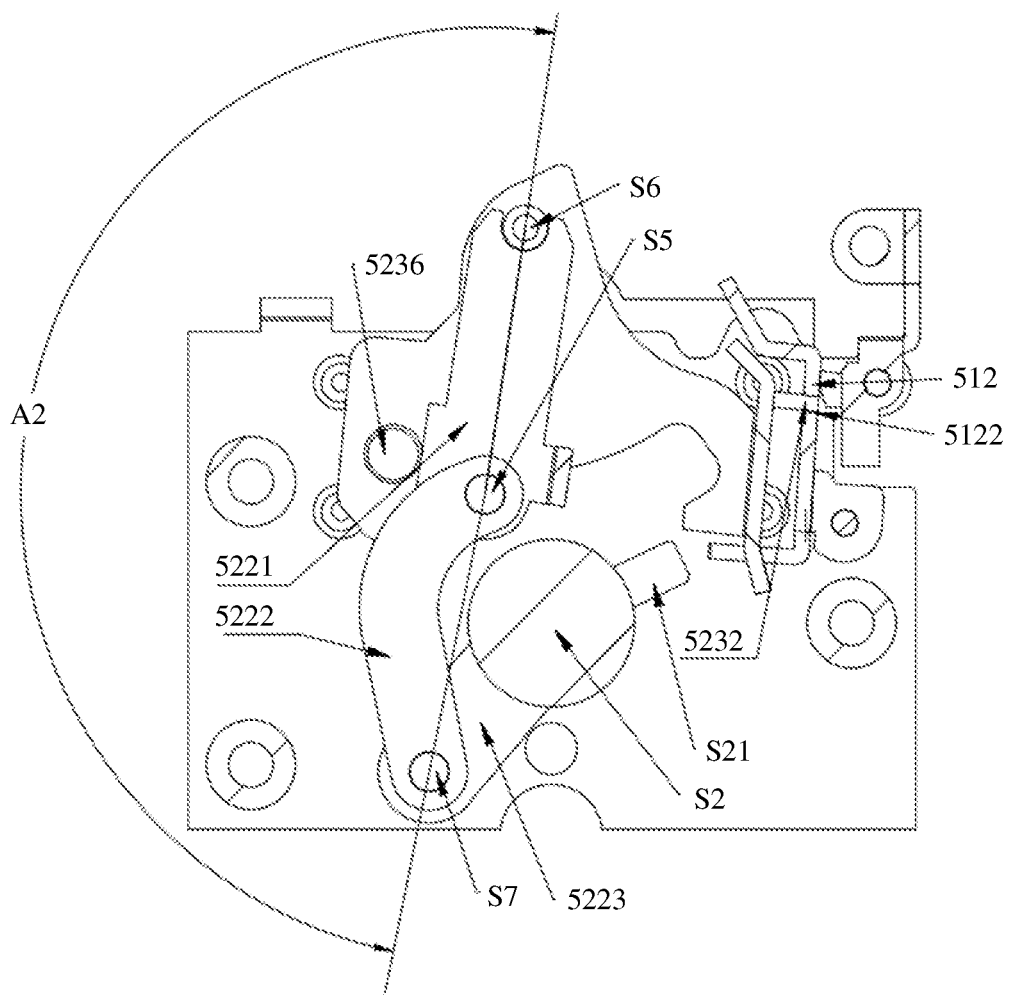
FIG. 34 is a schematic diagram of a trip-free structure of a switch in a manual switch-on state according to an embodiment.

With reference to FIG. 33, FIG. 34, and FIG. 14, manual switch-on or switch-off of the switch can be implemented by rotating the knob. The buckle structure 5232 of the cradle 523 keeps fitting in with the buckle hole 5122 of the latch 512 of the trip unit 51 in manual switch-on and manual switch-off processes. The knob drives the knob rotating shaft 51 to be rotated, and the knob rotating shaft 51 drives, by using the connecting rod mechanism 525, the transmission member 521 to swing by using the transmission rotating shaft S3 as a fulcrum. Elastic deformation occurs on the elastic member 524 in a swinging process of the transmission member 521. Elastic force of the elastic member 524 drives the connecting rod structure 522 to move, and the main shaft 5223 of the connecting rod structure 522 drives the contact rotating shaft S2 to be rotated. In this way, the moving contact 234 is rotated, so that the moving contact 234 is separated from the fixed contact 233. As shown in FIG. 33, the moving contact 234 is limited to be in the manual switch-off state by contact limiting between the first rotating shaft S5 of the connecting rod structure 522 and an inner wall of the groove 5237 of the cradle 523.

In this embodiment, when the moving contact 234 is in contact with the fixed contact 233, clamping force exists between the moving contact 234 and the fixed contact 233, a direction of the clamping force is the first direction, and a moving direction of the moving contact 234 is perpendicular to the first direction when the moving contact 234 is separated from the fixed contact 233. Force that drives the moving contact 234 to separate from the fixed contact 233 is perpendicular to the first direction, and the clamping force in the first direction also exists between the moving contact 234 and the fixed contact 233 when the moving contact 234 and the fixed contact 233 are in contact with each other. Therefore, in a manual switch-off process, large switch-off force is needed to drive the moving contact 234. In an embodiment, in the manual switch-off state, that is, a state shown in FIG. 33, an included angle A1 between an elastic force direction of the elastic member 524 and the upper connecting rod 5221 is greater than or equal to 30 degrees and less than or equal to 45 degrees. The elastic force direction of the elastic member 524 is a direction of a connection line between two ends of the elastic member 524, and an extension direction of the upper connecting rod 5221 is a direction of a connection line between a central location of a rotating shaft (namely, the second rotating shaft S6) between the upper connecting rod 5221 and the cradle 523 and a central location of the rotating shaft (namely, the first rotating shaft S5) between the lower connecting rod 5222 and the upper connecting rod 5221. In this embodiment, large switch-off force can be achieved by limiting a range of the included angle between the elastic force direction of the elastic member 524 and the upper connecting rod 5221 in the manual switch-off state. A larger included angle A1 between the elastic member 524 and the upper connecting rod 5221 leads to larger switch-off force. However, to provide suitable driving force for the moving contact 234 in switch-on and trip-free processes of the switch, the included angle A1 between the elastic force direction of the elastic member 524 and the upper connecting rod 5221 may be limited to be greater than or equal to 35 degrees and less than or equal to 40 degrees.

The manual switch-on process is as follows: The knob is rotated to enable the knob rotating shaft to be rotated, and the connecting rod mechanism 525 drives the transmission member to swing by using the transmission rotating shaft S3 as a fulcrum. The elastic deformation occurs on the elastic member 524 in the swinging process of the transmission member. The elastic force of the elastic member 524 drives the connecting rod structure 522 to move, and the main shaft of the connecting rod structure 522 drives the contact rotating shaft S2 to be rotated. In this way, the moving contact 234 moves to be in contact with the fixed contact 233. A state in which the moving contact 234 is in contact with the fixed contact 233 is the manual switch-on state. As shown in FIG. 34, the upper connecting rod 5221 is in contact with the switch-on limiting structure 5236, to limit the connecting rod structure 522 to be at a manual switch-on location and limit the location of the moving contact 234, so that the moving contact 234 just fits in with the fixed contact 233 to implement a circuit connection. In an embodiment, in the manual switch-on state, an included angle A2 between the lower connecting rod 5222 and the upper connecting rod 5221 of the connecting rod structure 522 is greater than or equal to 170 degrees and less than 180 degrees. An advantage of limiting a range of the included angle A2 between the upper connecting rod 5221 and the lower connecting rod 5222 is that fast switch-off can be implemented. In the manual switch-on state, the connecting rod structure 522 can quickly drive the moving contact 234 to move, and if the included angle A2 between the upper connecting rod 5221 and the lower connecting rod 5222 is closer to 180 degrees, a speed of driving the moving contact 234 and the fixed contact 233 to be switched off is faster. The included angle A2 between the upper connecting rod 5221 and the lower connecting rod 5222 cannot be equal to 180 degrees. A location at which the included angle A2 between the upper connecting rod 5221 and the lower connecting rod 5222 is 180 degrees is a dead spot location. The range of the included angle A2 between the upper connecting rod 5221 and the lower connecting rod 5222 may be from 170 degrees to 178 degrees in consideration of factors such as a design error, a fabrication process tolerance, and an error in an assembly process. In an embodiment, the range of the included angle A2 between the upper connecting rod 5221 and the lower connecting rod 5222 is from 175 degrees to 178 degrees. This can improve a switch-off function of the switch.

Figure 35:
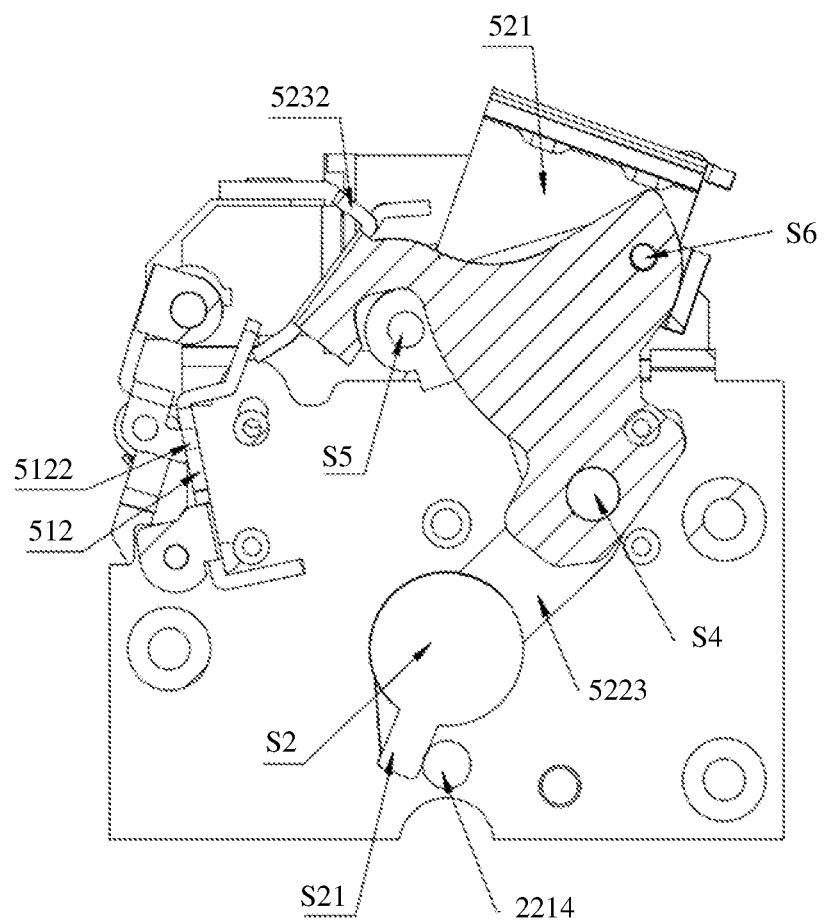
FIG. 35 is a schematic diagram of a trip-free structure of a switch in a trip-free (that is, fault trip) state according to an embodiment.

As shown in FIG. 35, when a circuit fault occurs in the power supply system, the trip unit 51 receives a switch-off signal in this embodiment, and the latch 512 of the trip unit 51 moves, so that the buckle structure 5232 of the cradle 523 is separated from the buckle hole 5122 of the latch 512. In this state, the cradle 523 is no longer restricted by the trip unit 51, and the cradle 523 is automatically rotated by using the cradle rotating shaft S4 as a center. In a rotation process of the cradle 523, the cradle 523 drives the connecting rod structure 522 to move, and the connecting rod structure 522 drives the contact rotating shaft S2 to be rotated, to drive the moving contact to move, so that the moving contact 234 is separated from the fixed contact 233, thereby implementing free cradling. In a free cradling process, even if the transmission member 521 and the knob do not move, the movement of the connecting rod structure 522 is not affected, because the cradle 523 directly drives the connecting rod structure 522 to move and only the connecting rod structure 522 exists on a transmission path from the cradle 523 to the contact rotating shaft S2. Therefore, even if the knob is stuck and cannot move, the switch can implement free cradling. In a free cradling state, the contact rotating shaft S2 is restricted by contact between the trip limiting structure 2214 and the limiting blocks S21 on the contact rotating shaft S2, so that the moving contact 234 is in a still state in the re-buckling process.

In summary, the knob in the switch may be used for manual switch-off and manual switch-on operations, and the knob drives the connecting rod structure to move to implement manual switch-on or switch-off. The switch has a trip-free function, and through unlocking of the trip unit from the cradle (removal of a buckling relationship between the buckle structure and the buckle hole), the cradle can drive the connecting rod structure to move, and the connecting rod structure drives the moving contact to move, thereby implementing switch-off. Because the knob and the transmission member are free of force transfer in a trip-free process, if the knob is blocked by a cable or other components and cannot be rotated in the trip-free process, the switch can still implement trip free. The knob can also be used for re-buckling after automatic tripping in a fault state, the knob can be rotated to drive the connecting rod structure to move, and the connecting rod structure drives the cradle to move to be buckled with the trip unit, to complete the re-buckling process.

The foregoing embodiments are merely intended to describe the embodiments, but are not limiting. Although described in detail with reference to the foregoing embodiments, a person of ordinary skill in the art should understand that modifications can still be made, without departing from the scope of the of embodiments.

What is claimed is:

1. A power supply system comprising:
a control unit,
a switch,
a direct current source, and
a power conversion unit, wherein the switch is electrically connected between the direct current source and the power conversion unit, and the control unit is configured to send a switch-off signal to the switch when a fault occurs on the direct current source or the power conversion unit; and the switch further comprises:
a contact component, comprising a fixed part and a movable part, wherein the movable part is rotatably connected to the fixed part, the fixed part is provided with a fixed contact, the movable part is provided with a moving contact, the movable part has a central shaft, and the movable part is configured to rotate by using the central shaft as a center of rotation, to enable the moving contact and the fixed contact to be switched on or switched off;

a knob configured to drive the moving contact and the fixed contact to be switched on or switched off; and a trip-free structure, disposed in a stacked manner between the knob and the contact component, wherein the trip-free structure comprises a trip unit and a transmission structure, the transmission structure comprises a connecting rod structure and a cradle, the connecting rod structure is connected between the cradle and the movable part, the cradle fits within the trip unit, the trip unit is configured to receive the switch-off signal to unlock the trip unit from the cradle, and the cradle is configured to drive the connecting rod structure to move, to separate the moving contact from the fixed contact, and switch off the switch.

2. The power supply system according to claim 1, wherein the knob is further configured to drive the connecting rod structure to move and to drive the cradle to move to be re-buckled with the trip unit.

3. The power supply system according to claim 1, wherein the trip-free structure further comprises a contact rotating shaft and a knob rotating shaft, the contact rotating shaft is fixedly connected to a location of the central shaft of the movable part, one end of the connecting rod structure is fixedly connected to the contact rotating shaft, the knob rotating shaft is fixedly connected to the knob, and axial extension directions of both the contact rotating shaft and the knob rotating shaft are the first direction.

4. The power supply system according to claim 1, wherein the trip-free structure further comprises a mounting bracket and a contact rotating shaft, a trip limiting structure is disposed on the mounting bracket, the contact rotating shaft is rotatably connected to the mounting bracket, the contact rotating shaft is fixedly connected to a location of the central shaft of the movable part, one end of the connecting rod structure is fixedly connected to the contact rotating shaft, limiting blocks are disposed in a protruding manner on a periphery of the contact rotating shaft, and the limiting blocks abut against the trip limiting structure in a process in which the trip unit drives the moving contact and the fixed contact to separate from each other, to limit the contact rotating shaft, so that the moving contact enters a still state in a re-buckling process.

5. The power supply system according to claim 1, wherein the moving contact is further configured to rotate on a plane perpendicular to the central shaft by using the central shaft as a center, and a rotation angle of the moving contact is greater than or equal to 50 degrees.

6. The power supply system according to claim 1, wherein the trip-free structure further comprises a transmission member and an elastic member, the elastic member is elastically connected between the connecting rod structure and the transmission member, and the transmission member is connected to the knob, so that manual switch-on or switch-off of the switch is implemented in a process in which the knob is further configured to rotate to drive the transmission member to swing.

7. The power supply system according to claim 6, wherein in a manual switch-on or switch-off process of the switch, a rotation angle of the knob is greater than or equal to 50 degrees.

8. The power supply system according to claim 6, wherein, when the switch is in a manual switch-on state, the knob is located at a first location; when the switch is in a manual switch-off state, the knob is located at a second location; or in a state in which the trip unit drives the moving contact and the fixed contact to separate from each other, the switch is in a tripping state, and the knob is located at a third location, wherein the third location is between the first location and the second location.

9. The power supply system according to claim 6, wherein the connecting rod structure further comprises an upper connecting rod, a lower connecting rod, and a main shaft, one end of the upper connecting rod is rotatably connected to the cradle, an other end of the upper connecting rod is rotatably connected to one end of the lower connecting rod by using a first rotating shaft, an other end of the lower connecting rod is rotatably connected to one end of the main shaft, an other end of the main shaft is fixedly connected to the moving contact, one end of the elastic member is fixedly connected to a location of the first rotating shaft, and a groove is formed at an edge location of the cradle; in a process in which the switch is switched between a manual switch-off state and a manual switch-on state, the first rotating shaft is further configured to move in the groove; and movement of the connecting rod structure is restricted by contact between the first rotating shaft and an inner wall of the groove, to limit the moving contact to be in the manual switch-off state.

10. The power supply system according to claim 6, wherein the trip-free structure further comprises a mounting bracket and a mounting plate that are fixedly connected to each other, the mounting bracket is disposed in a stacked manner between the contact component and the mounting plate in the first direction, the transmission member and the mounting bracket are connected to a location of a transmission rotating shaft, the knob is rotatably connected to the mounting plate, the trip-free structure further comprises a connection unit, the connection unit is fixedly connected to the knob, and the connection unit fits within the transmission member, so that in a rotation process of the knob, the connection unit is further configured to drive the transmission member to swing by using the transmission rotating shaft as a center.

11. The power supply system according to claim 10, wherein an accommodation space is enclosed by the mounting bracket, the connecting rod structure, the cradle, and at least a part of the elastic member are located in the accommodation space, the transmission member comprises swing arms and a connecting arm, a part of one of the swing arms is disposed in a stacked manner between the mounting bracket and the mounting plate in the first direction, the swing arms fit within the connection unit so that the connection unit is further configured to drive the transmission member to move, the connecting arm is bent relative to the swing arms, the connecting arm is located on one side edge of the mounting bracket, at least a part of the connecting arm faces the accommodation space, one end of the elastic member is fixedly connected to the connecting arm, and the other end of the elastic member extends into the accommodation space and is connected to the connecting rod structure.

12. A switch, comprising:
a contact component, comprising a fixed part and a movable part, wherein the fixed part is disposed on a periphery of the movable part, the fixed part is provided with a fixed contact, the movable part is provided with a moving contact, the movable part has a central shaft, and the movable part is configured to rotate by using the central shaft as a center;

a knob, configured to drive the moving contact and the fixed contact to be switched on or switched off; and a trip-free structure, disposed in a stacked manner between the knob and the contact component, wherein the trip-free structure comprises a trip unit and a transmission structure, the transmission structure comprises a connecting rod structure and a cradle, the connecting rod structure is connected between the cradle and the movable part; the cradle fits within the trip unit, the trip unit is configured to receive a switch-off signal sent by a control unit in a power supply system, to unlock the trip unit from the cradle, and the cradle configured to drive the connecting rod structure to move, to separate the moving contact from the fixed contact.

13. The switch according to claim 12, wherein the knob is further configured to drive the connecting rod structure to move, to drive the cradle to move to be re-buckled with the trip unit.

14. The switch according to claim 12, wherein the trip-free structure further comprises a contact rotating shaft and a knob rotating shaft, the contact rotating shaft is fixedly connected to a location of the central shaft of the movable part, one end of the connecting rod structure is fixedly connected to the contact rotating shaft, the knob rotating shaft is fixedly connected to the knob, and axial extension directions of both the contact rotating shaft and the knob rotating shaft are the first direction.

15. The switch according to claim 12, wherein the trip-free structure further comprises a mounting bracket and a contact rotating shaft, a trip limiting structure is disposed on the mounting bracket, the contact rotating shaft is rotatably connected to the mounting bracket, the contact rotating shaft is fixedly connected to a location of the central shaft of the movable part, one end of the connecting rod structure is fixedly connected to the contact rotating shaft, limiting blocks are disposed in a protruding manner on a periphery of the contact rotating shaft, and the limiting blocks abut against the trip limiting structure in a process in which the trip unit drives the moving contact and the fixed contact to separate from each other, to limit the contact rotating shaft, so that the moving contact enters a still state in a re-buckling process.

16. The switch according to claim 12, wherein the moving contact is rotated on a plane perpendicular to the central shaft by using the central shaft as a center, and a rotation angle of the moving contact is greater than or equal to 50 degrees.

17. A power conversion apparatus, comprising a housing and the switch according to claim 12, wherein the knob of the switch is located outside the housing, and the contact component and the trip-free structure of the switch are located inside the housing.

18. The switch according to claim 12, wherein the trip-free structure further comprises a transmission member and an elastic member, the elastic member is elastically connected between the connecting rod structure and the transmission member, and the transmission member is connected to the knob, so that manual switch-on or switch-off of the switch is implemented in a process in which the knob is configured to rotate to drive the transmission member to swing.

19. The switch according to claim 18, wherein, in a manual switch-on or switch-off process of the switch, a rotation angle of the knob is greater than or equal to 50 degrees.

20. The switch according to claim 18, wherein the trip-free structure further comprises a mounting bracket and a mounting plate that are fixedly connected to each other, the mounting bracket is disposed in a stacked manner between the contact component and the mounting plate, the transmission member and the mounting bracket are connected to a location of a transmission rotating shaft, the knob is rotatably connected to the mounting plate, the trip-free structure further comprises a connection unit, the connection unit is fixedly connected to the knob, and the connection unit fits within the transmission member, so that in a rotation process of the knob, the connection unit is configured to drive the transmission member to swing by using the transmission rotating shaft as a center.

* * * * *